US008548803B2

(12) United States Patent
Bradley et al.

(10) Patent No.: US 8,548,803 B2
(45) Date of Patent: *Oct. 1, 2013

(54) SYSTEM AND METHOD OF PROCESSING A SOUND SIGNAL INCLUDING TRANSFORMING THE SOUND SIGNAL INTO A FREQUENCY-CHIRP DOMAIN

(75) Inventors: David C. Bradley, La Jolla, CA (US);
Daniel S. Goldin, Malibu, CA (US);
Robert N. Hilton, San Diego, CA (US);
Nicholas K. Fisher, San Diego, CA (US); Rodney Gateau, San Diego, CA (US); Derrick R. Roos, San Diego, CA (US); Eric Wiewiora, San Diego, CA (US)

(73) Assignee: The Intellisis Corporation, San Diego, CA (US)

( * ) Notice: Subject to any disclaimer, the term of this patent is extended or adjusted under 35 U.S.C. 154(b) by 89 days.

This patent is subject to a terminal disclaimer.

(21) Appl. No.: 13/205,535

(22) Filed: Aug. 8, 2011

(65) Prior Publication Data

US 2013/0041658 A1    Feb. 14, 2013

(51) Int. Cl.
*G10L 11/06*    (2006.01)
*G10L 11/00*    (2006.01)
*G10L 11/04*    (2006.01)
*G10L 19/00*    (2013.01)
*G10L 19/14*    (2006.01)

(52) U.S. Cl.
USPC ........... 704/208; 704/200; 704/207; 704/217; 704/218; 704/205; 704/206

(58) Field of Classification Search
USPC .................. 704/200, 205–208, 217
See application file for complete search history.

(56) References Cited

U.S. PATENT DOCUMENTS

| 5,321,636 | A | 6/1994 | Beerends | 364/485 |
| 5,684,920 | A | 11/1997 | Iwakami et al. | 395/2.12 |
| 6,356,868 | B1 * | 3/2002 | Yuschik et al. | 704/246 |
| 6,477,472 | B2 | 11/2002 | Qian et al. | 702/35 |
| 6,526,376 | B1 | 2/2003 | Villette et al. | 704/207 |
| 7,660,718 | B2 | 2/2010 | Padhi et al. | 704/268 |

(Continued)

FOREIGN PATENT DOCUMENTS

| WO | WO 2013/022914 | 2/2013 |
| WO | WO 2013/022918 | 2/2013 |
| WO | WO 2013/022923 | 2/2013 |
| WO | WO 2013/022930 | 2/2013 |

OTHER PUBLICATIONS

Luis Werauaga and Marian Kepsi, "Speech Analysis with the Fast Chirp Transform", 2004, Euispco, www.eurasip.org/Proceedings/Eusipco/Eusipco2004/.../cr1374.pdf.*

(Continued)

*Primary Examiner* — Pierre-Louis Desir
*Assistant Examiner* — Anne Thomas-Homescu
(74) *Attorney, Agent, or Firm* — Pillsbury Winthrop Shaw Pittman LLP

(57) ABSTRACT

A system and method may be configured to process an audio signal. The system and method may track pitch, chirp rate, and/or harmonic envelope across the audio signal, may reconstruct sound represented in the audio signal, and/or may segment or classify the audio signal. A transform may be performed on the audio signal to place the audio signal in a frequency chirp domain that enhances the sound parameter tracking, reconstruction, and/or classification.

12 Claims, 20 Drawing Sheets

(56) References Cited

U.S. PATENT DOCUMENTS

| | | | |
|---|---|---|---|
| 7,672,836 | B2 | 3/2010 | Lee et al. ............... 704/207 |
| 2002/0152078 | A1 | 10/2002 | Yuschik et al. ........... 704/273 |
| 2004/0133424 | A1 | 7/2004 | Ealey et al. ............. 704/233 |
| 2005/0149321 | A1 | 7/2005 | Kabi et al. .............. 704/207 |
| 2009/0091441 | A1 | 4/2009 | Schweitzer, III et al. ... 340/531 |
| 2010/0042407 | A1 | 2/2010 | Crockett ............... 704/200.1 |
| 2010/0262420 | A1 | 10/2010 | Herre et al. ............. 704/201 |
| 2012/0243694 | A1 | 9/2012 | Bradley et al. ........... 381/56 |
| 2013/0041489 | A1 | 2/2013 | Bradley et al. ........... 700/94 |
| 2013/0041656 | A1 | 2/2013 | Bradley et al. ........... 704/207 |
| 2013/0041657 | A1 | 2/2013 | Bradley et al. ........... 704/207 |

OTHER PUBLICATIONS

L. Weruaga and M. Kepesi, "Adaptive Chirp-based time-frequency analysis of speech signals", 2006, Speech communication, vol. 48, No. 5, p. 474-492.*

C. Ioana, A. Quinquis, "The Adaptive Time-Frequency Distribution Using the Fractional Fourier Transform", 18° Colloque sur le traitement du signal et des images, 2001 ; p. 52-55.*

"Fast Maximum Likelihood Joint Estimation of Frequency and Frequency Rate", T.J. Abatzoglou, IEEE Transactions on Aerospace and Electronic Systems, vol. AES-22, Issue 6, pp. 708-715.*

Xia, Xiang-Gen, "Discrete Chirp-Fourier Transform and Its Application to Chirp Rate Estimation", *IEEE Transactions on Signal Processing*, vol. 48, No. 11, Nov. 2000, pp. 3122-3133.

Boashash, Boualem, "Time-Frequency Signal Analysis and Processing: A Comprehensive Reference", [online], Dec. 2003, retrieved on Sep. 26, 2012 from http://gspace.qu.edu.ga/bitstream/handle/10576/10686/Boashash%20book-part1_tfsap_concepts.pdf?seq.., 103 pages.

Yin et al., "Pitch- and Formant-Based Order Adaptation of the Fractional Fourier Transform and Its Application to Speech Recognition", *EURASIP Journal of Audio, Speech, and Music Processing*, vol. 2009, Article ID 304579, [online], Dec. 2009, Retrieved on Sep. 26, 2012 from http://downloads.hindawi.com/journals/asmp/2009/304579.pdf, 14 pages.

Rabiner, Lawrence R., "On the Use of Autocorrelation Analysis for Pitch Detection", *IEEE Transactions on Acoustics, Speech, and Signal Processing*, vol. ASSP-25, No. 1, Feb. 1977, pp. 24-33.

Lahat, Meir, et al., "A Spectral Autocorrelation Method for Measurement of the Fundamental Frequency of Noise-Corrupted Speech", *IEEE Transactions on Acoustics, Speech, and Signal Processing*, vol. ASSP-35, No. 6, Jun. 1987, pp. 741-750.

Kepesi, Marian, et al., "Adaptive Chirp-Based Time-Frequency Analysis of Speech Signals", *Speech Communication*, vol. 48, No. 5, 2006, pp. 474-492.

Robel, A., et al., "Efficient Spectral Envelope Estimation and Its Application to Pitch Shifting and Envelope Preservation", *Proc. of the 8th Int. Conference on Digital Audio Effects (DAFx'05)*, Madrid, Spain, Sep. 20-22, 2005, 6 pages.

* cited by examiner

SYSTEM AND METHOD OF PROCESSING A SOUND SIGNAL INCLUDING TRANSFORMING THE SOUND SIGNAL INTO A FREQUENCY-CHIRP DOMAIN

FIELD

The disclosure relates to processing an audio signal by leveraging a transform the places the audio signal into a frequency-chirp domain that specifies a coefficient related to signal intensity as a function of frequency and fractional chirp rate.

BACKGROUND

Generally, conventional sound processing involves converting an audio signal from the time domain into the frequency domain for individual time windows. Various types of signal processing techniques and algorithms may then be performed on the signal in the frequency domain in an attempt to distinguish between sound and noise represented in the signal before further processing can be performed. This processed signal may then be analyzed to determine sound parameters such as pitch, envelope, and/or other sound parameters. Sounds represented in the signal may be classified.

Conventional attempts to distinguish between harmonic sound and noise (whether sonic noise represented in the signal or signal noise) may amount to attempts to "clean" the signal to distinguish between harmonic sounds and background noise. Unfortunately, often times these conventional techniques result in a loss of information about harmonic sounds represented in the signal, as well as noise. The loss of this information may impact the accuracy and/or precision of downstream processing to, for example, determine sound parameter(s) of harmonic sound, classify harmonic sounds, and/or other downstream processing.

SUMMARY

One aspect of the disclosure relates to a system and method configured to process an audio signal. The system and method may track pitch, chirp rate, and/or harmonic envelope across the audio signal, may reconstruct sound represented in the audio signal, and/or may segment or classify the audio signal. A transform may be performed on the audio signal to place the audio signal in a frequency chirp domain that enhances the sound parameter tracking, reconstruction, and/or classification.

The system may include one or more processors configured to execute computer program modules. The computer program modules may include one or more of a first set, a second set, a third set, a fourth set, and/or a fifth set of computer program modules.

The first set of computer program modules may be configured to transform individual time sample windows of the audio signal into the frequency-chirp domain. The frequency-chirp domain representation of a given time sample window may specify a transform coefficient as a function of frequency and fractional chirp rate for the signal portion. The first set of computer program modules may include one or more of a signal module, a time sample window module, a transform module, and/or other modules.

The second set of computer program modules may be configured to determine, from the transformed audio information for the given time sample window, a pitch likelihood metric as a function of pitch and fractional chirp rate for the audio signal within the time sample window. The second set of computer program modules may be configured (i) to determine, from the transformed audio information for the given time sample window, a tone likelihood metric as a function of frequency for the audio signal within the time sample window, and (ii) to determine the pitch likelihood metric for the given time sample window from the tone likelihood metric. The second set of computer program modules may include one or more of a tone likelihood module, a pitch likelihood module, and/or other modules.

The third set of computer program modules may be configured to determine, based on the pitch likelihood metric, estimated pitch and estimated fractional chirp rate for the individual time sample windows. The third set of computer program modules may be configured (i) to divide the time sample windows into groups within processing time windows, (ii) to identify a primary time sample window within a given processing time window, and (iii) to determine pitch for time sample windows within the given processing time window by iterating through the processing time window from the primary time sample window toward one or both of the boundaries of the processing time window and determining the estimated pitch and estimated fractional chirp rate for a given time sample window from values of pitch likelihood metric weighted based on parameters of sound determined for a time sample window adjacent to the given time sample window. The third set of one or more computer program modules may be configured such that the parameters of sound within the adjacent time sample window used to weight pitch likelihood metric in the given time sample window include one or more of estimated pitch, estimated chirp, or harmonic envelope. The third set of computer program modules may include one or more of a processing time window module, a primary window module, a pitch estimation module, a pitch prediction module, an envelope vector module, an envelope correlation module, a weighting module, an estimated pitch aggregation module, a voiced section module, and/or other modules.

The fourth set of computer program modules may be configured to reconstruct sound represented the audio signal based on one or both of the transformed audio information generated by the first set of computer program modules and/or the estimated pitch and estimated chirp rate determined by the third set of computer program modules. The fourth set of computer program modules may include one or more of a resynthesis module, a noise subtraction module, a fence model module, a reconstruction module, and/or other modules.

The fifth set of computer program modules may be configured to classify one or more speakers that voiced one or more sounds represented in the audio signal based on one or both of the transformed audio information generated by the first set of computer program modules and/or the estimated pitch and estimated chirp rate determined by the third set of computer program modules. The fifth set of computer program module may include one or more of an audio feature module, an information reduction module, a spectral slope module, a noise estimator module, an aggregate score module, a training module, and/or other modules.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
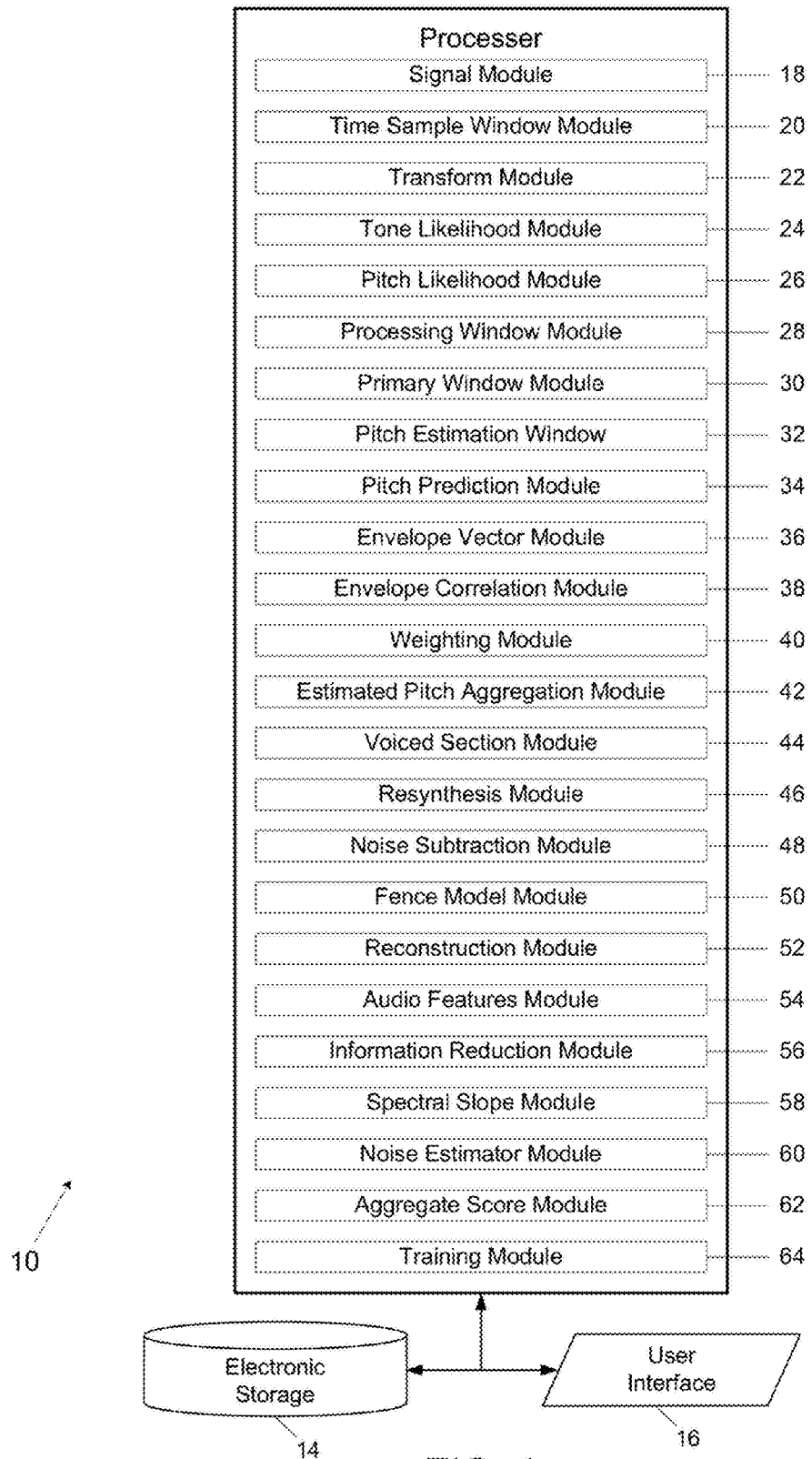
FIG. 1 illustrates a system configured to process an audio signal.

FIG. 1 illustrates a system 10 configured to process an audio signal. The processing accomplished by system 10 may include one or more of transforming the audio signal, identifying one or more sound parameters of sounds represented in the audio signal, reconstructing one or more sounds represented in the audio signal, segmenting and/or classifying portions of the audio signal, and/or other processing. In some implementations, system 10 may include one or more of one or more processors 12, electronic storage 14, a user interface 16, and/or other components.

The processor 12 may be configured to execute one or more computer program modules. The computer program modules may include one or more of a signal module 18, a time sample window module 20, a transform module 22, a tone likelihood module 24, a pitch likelihood module 26, a processing window module 28, a peak likelihood module 30, a pitch estimation module 32, a pitch prediction module 34, an envelope vector module 36, an envelope correlation module 38, a weighting module 40, an estimated pitch aggregation module 42, a voiced section module 44, a resynthesis module 46, a noise subtraction module 48, a fence model module 50, a reconstruction module 52, an audio features module 54, an information reduction module 56, a spectral slope module 58, a signal-to-noise ratio (SNR) estimator module 60, an aggregate score module 62, a training module 64, and/or other modules.

The signal module 18 may be configured to obtain sound signals for processing. The signal module 18 may be configured to obtain a sound signal from electronic storage 14, from user interface 16 (e.g., a microphone, a transducer, and/or other user interface components), from an external source, and/or from other sources. The sound signals may include electronic analog and/or digital signals that represents sounds generated by sources and/or noise. As used herein, a "source" may refer to an object or set of objects that operate to produce a sound. For example, a stringed instrument, such as a guitar may be considered as an individual source even though it may itself include a plurality of objects cooperating to generate sounds (e.g., a plurality of strings, the body, and/or other objects). Similarly, a group of singers may generate sounds in concert to produce a single, harmonic sound.

Figure 2:
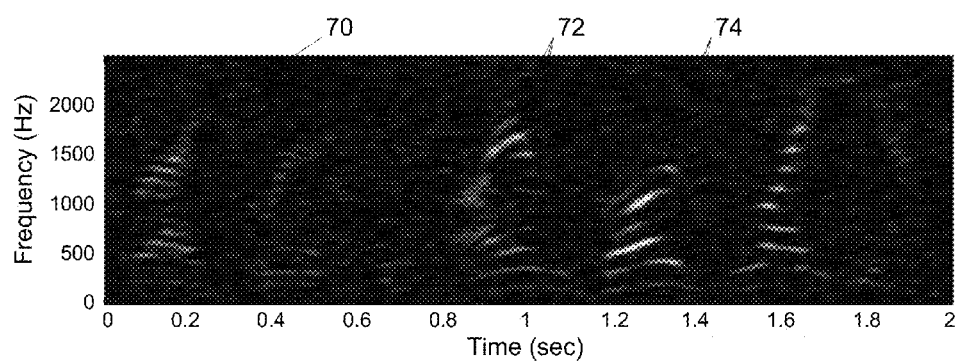
FIG. 2 illustrates a spectrogram of a sound signal.

The signal module 18 may be configured such that the obtained sound signals may specify signal intensity as a function of time. An individual sound signal may have a sampling rate at which amplitude is represented. The sampling rate may correspond to a sampling period. The spectral density of a sound signal may be represented, for example, in a spectrogram. By way of illustration, FIG. 2 depicts a spectrogram 70 in a time-frequency domain. In spectrogram 70, amplitude may be the third dimension, and may be represented as color (e.g., the lighter color, the greater the amplitude).

In a sound signal, contributions attributable to a single sound and/or source may be arranged at harmonic (e.g., regularly spaced) intervals. These spaced apart contributions to the sound signal may be referred to as "harmonics" or "overtones". For example, spectrogram 70 includes a first set of overtones (labeled in FIG. 2 as overtones 72) associated with a first sound and/or source and a second set of overtones (labeled in FIG. 2 as overtones 74) associated with a second sound and/or source. The first sound and the second sound may have been generated by a common source, or by separate sources. The spacing between a given set of overtones corresponding to a sound at a point in time may be referred to as the "pitch" of the sound at that point in time.

Referring back to FIG. 1, time sample window module 20 may be configured to separate a sound signal into signal portions. The signal portions may be associated with individual time sample windows. The time sample windows may be consecutive across time, may overlap, may be spaced apart, and/or may be arranged over time in other ways. An individual time sample window may correspond to a period of time that is greater than the sampling period of the sound signal being separated into signal portions. As such, the signal portion associated with a time sample window may include a plurality of signal samples.

The parameters of the processing performed by time sample window module 20 may include the type of peaked window function (e.g. Gaussian), the width of this function (for a Gaussian, the standard deviation), the total width of the window (for a Gaussian, typically 6 standard deviations total), the arrangement of the time sample windows (e.g., consecutively, overlapping, spaced apart, and/or other arrangements), and/or other parameters. One or more of these parameters may be set based on user selection, preset settings, the sound signal being processed, and/or other factors. By way of non-limiting example, the time sample windows may correspond to a period of time that is between about 5 milliseconds and about 50 milliseconds, between about 5 milliseconds and about 30 milliseconds, between about 5 milliseconds and about 15 milliseconds, and/or in other ranges. Since the processing applied to sound signals by system 10 accounts for the dynamic nature of the sound signals in the signal portions the time sample windows may correspond to an amount of time that is greater than in conventional sound processing systems. For example, the time sample windows may correspond to an amount of time that is greater than about 15 milliseconds. In some implementations, the time sample windows may correspond to about 10 milliseconds.

The chirp rate variable may be a metric derived from chirp rate (e.g., or rate of change in frequency). For example, In some implementations, the chirp rate variable may be the fractional chirp rate. The fractional chirp rate may be expressed as:

$$\chi = X/\omega; \quad (1)$$

where $\chi$ represents fractional chirp rate, X represents chirp rate, and w represents frequency.

The processing performed by transform module 22 may result in a multi-dimensional representation of the audio. This representation, or "space," may have a domain given by frequency and (fractional) chirp rate. The representation may have a co-domain (output) given by the transform coefficient. As such, upon performance of the transform by transform module 22, a transformed signal portion may specify a transform coefficient as a function of frequency and fractional chirp rate for the time sample window associated with the transformed signal portion. The transform coefficient for a specific frequency and fractional chirp rate pair may represent the complex number directly produced by the transform, the modulus of this complex number, or the square of this modulus, for the specific frequency and fractional chirp rate within the time sample window associated with the transformed signal portion.

Figure 3:
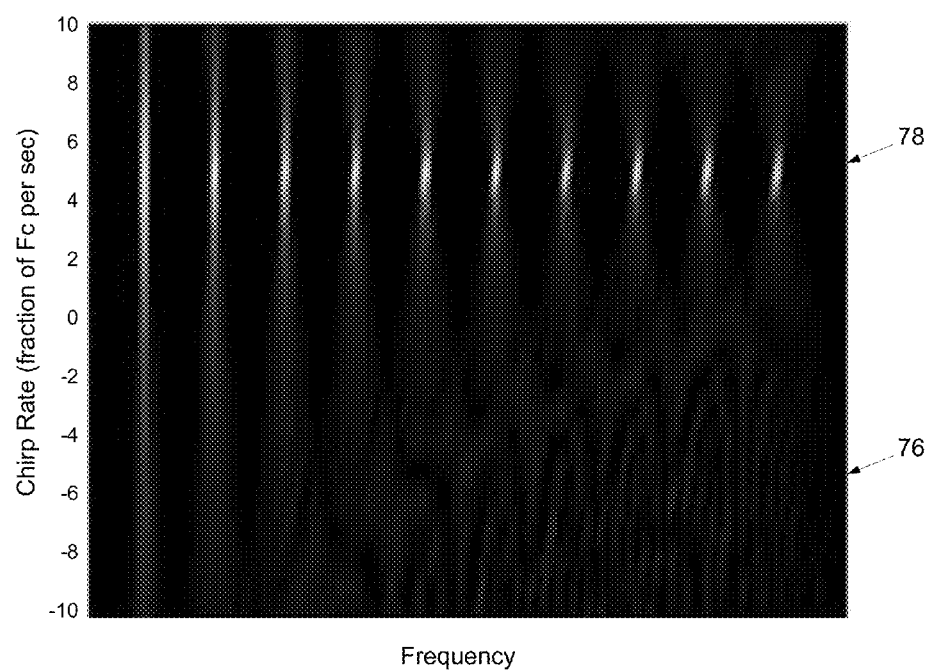
FIG. 3 illustrates a plot of a transformed sound signal in the frequency-chirp domain.

By way of illustration, FIG. 3 illustrates a chirp space 36 in a frequency-chirp domain for a transformed signal portion. In FIG. 3, the transform coefficient is represented by color, with larger magnitude transform coefficients being depicted as lighter than lower transform coefficients. Frequency may be represented along the horizontal axis of chirp space 36, and fractional chirp rate may be represented along the vertical axis of chirp space 36.

Referring back to FIG. 1, transform module 22 may be configured to transform signal portions by applying a set of filters to individual signal portions. Individual filters in the set of filters may correspond to different frequency and chirp rate variable pairs. By way of non-limiting example, a suitable set of filters (w) may be expressed as:

$$\psi_{f,c}(t) = \frac{1}{\sqrt{2\pi\sigma^2}} \exp\left[-\frac{1}{2}\left(\frac{t-t_0}{\sigma}\right)^2 + f(t-t_0)i + \frac{c}{2}(t-t_0)^2 i\right]; \quad (1)$$

where i is the imaginary number, t represents time, f represents the center frequency of the filter, c represents the chirp rate of the filter, and $\sigma$ represents the standard deviation (e.g., the width) of the time sample window of the filter.

The filters applied by transform module 22 may be complex exponentials. This may result in the transform coefficients produced by the filters including both real and imaginary components. As used herein, the "transform coefficient" may refer to a complex number including both real and imaginary components, a modulus of a complex number, the square of a modulus of a complex number, and/or other representations of complex numbers and/or components thereof. Applying the filters to a signal portion may be accomplished, for example, by taking the inner product of the time data of the signal portion and the complex filter. The parameters of the filters, such as central frequency, and chirp rate, may be set based on user selection, preset settings, the sound signal being processed, and/or other factors.

Transforming the audio signal into the frequency-chirp domain may facilitate the identification of signal intensity contributions of individual sounds (e.g., harmonic sounds) within the signal portions. As a given sound changes pitch, the change in frequency (or chirp rate) of a harmonic of the given sound may be characterized as a function of the rate at which the pitch is changing and the current frequency of the harmonic. This may be characterized for the $n^{th}$ harmonic as:

$$\Delta\phi = \omega_1(X_n/\omega_n) \quad (1)$$

where $\Delta\phi$ represents the rate of change in pitch ($\phi$), or "pitch velocity" of the sound, $X_n$ represents the chirp rate of the $n^{th}$ harmonic, $\omega_n$ represents the frequency of the $n^{th}$ harmonic, and $\omega_1$ represents the frequency of the first harmonic (e.g., the fundamental tone). By referring to equations (1) and (2), it may be seen that the rate of change in pitch of a sound and fractional chirp rate(s) of the $n^{th}$ harmonic of the sound are closely related, and that equation (2) can be rewritten as:

$$\Delta\phi = \omega_1 \cdot \chi_n. \quad (2)$$

Since the rate of change in pitch is a sound-wide parameter that holds for the sound as a whole, with all of its underlying harmonics (assuming a harmonic sound/source), it can be inferred from equation (3) that the fractional chirp rate may be the same for all of the harmonics of the sound. The system 10 may be configured to leverage this phenomenon to identify contributions of individual sounds in transformed signal portions.

By way of illustration, referring back to FIG. 3, the common fractional chirp rate across harmonics for an individual harmonic sound may mean the harmonic contributions of the sound may be aligned along a single horizontal row corresponding to the common fractional chirp rate for that individual sound. This row may be referred to as the "best chirp row" (see, e.g., best chirp row 78 in FIG. 3). If noise present in a signal portion is unstructured (uncorrelated in time), then most (if not substantially all) noise present in the signal portion can be assumed to have a fractional chirp rate different from a common fractional chirp rate of a sound represented in the signal portion. As such, identification of a common fractional chirp rate in a transformed signal portion (such as the one illustrated as chirp space 76) may be less susceptible to distortion due to noise than a signal portion that has not been transformed into the frequency-chirp domain.

Figure 4:
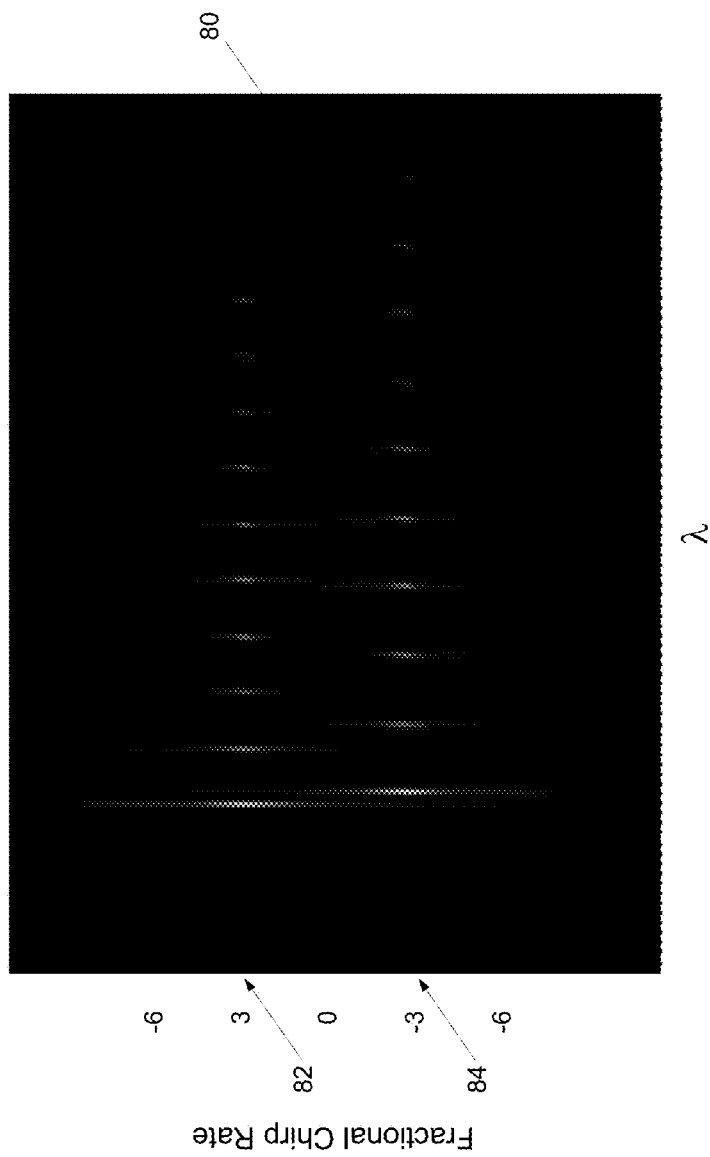
FIG. 4 illustrates a plot of a transformed sound signal in the frequency-chirp domain.

Similarly, a plurality of sounds present in a single signal portion may be distinguished in the frequency-chirp domain because they would likely have different fractional chirp rates. By way of non-limiting example, FIG. 4 illustrates a chirp space 80 in the frequency-chirp domain. The chirp space 80 may include a first best chirp row 82 corresponding to a first sound, and a second best chirp row 84 corresponding to a second sound. As can be seen in FIG. 4, each of the first sound and the second sound may have a similar pitch. As a result, conventional sound processing techniques may have difficulty distinguishing between these two distinct sounds. However, by virtue of separation along fractional chirp rate, chirp space 80 represents each of the first and second sounds separately, and facilitates identification of the two separate sounds.

Figure 5:
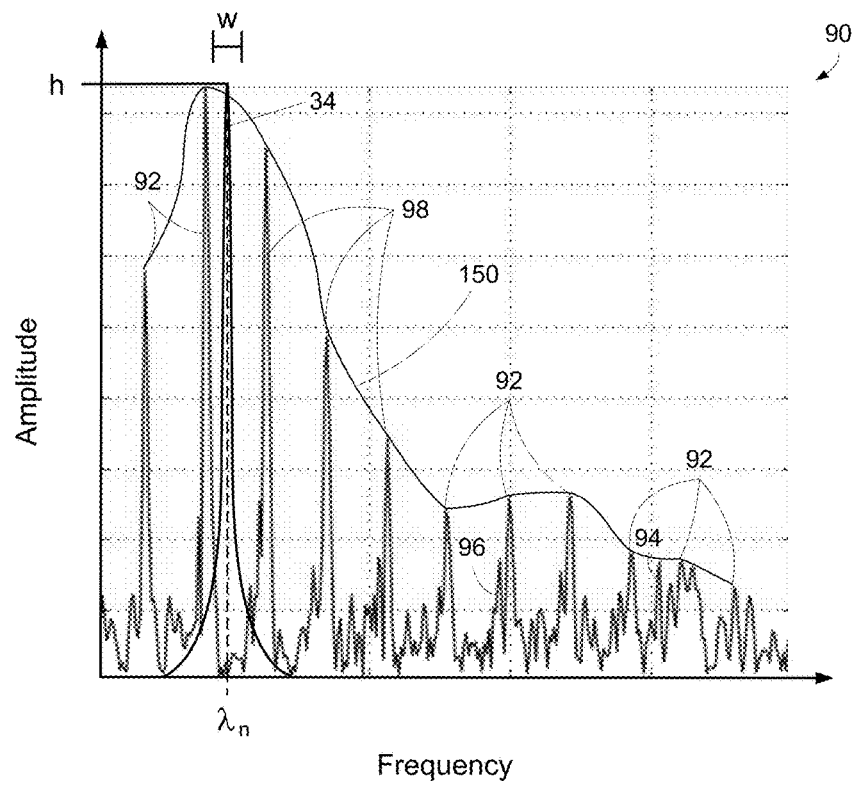
FIG. 5 illustrates a plot of transformed audio information.

It will be appreciated that a two dimensional view of transformed audio information may be taken, for example, along a slice through the frequency-chirp domain that corresponds to a specific fractional chirp rate (e.g., along one of fractional chirp rate rows 78, 82, or 84, shown in FIG. 3 or 4. By way of illustration, FIG. 5 depicts a plot 90 of transformed audio information. The plot 90 may be in a space that shows a magnitude of a'coefficient related to signal intensity as a function of frequency. The transformed audio information represented by plot 90 may include a harmonic sound, represented by a series of spikes 92 in the magnitude of the coefficient at the frequencies of the harmonics of the harmonic sound. Assuming that the sound is harmonic, spikes 92 may be spaced apart at intervals that correspond to the pitch ($\phi$) of the harmonic sound. As such, individual spikes 92 may correspond to individual ones of the overtones of the harmonic sound.

Other spikes (e.g., spikes 94 and/or 96) may be present in the transformed audio information. These spikes may not be associated with harmonic sound corresponding to spikes 92. The difference between spikes 92 and spike(s) 94 and/or 96 may not be amplitude, but instead frequency, as spike(s) 94 and/or 96 may not be at a harmonic frequency of the harmonic sound. As such, these spikes 94 and/or 96, and the rest of the amplitude between spikes 92 may be a manifestation of noise in the audio signal. As used in this instance, "noise" may not refer to a single auditory noise, but instead to sound (whether or not such sound is harmonic, diffuse, white, or of some other type) other than the harmonic sound associated with spikes 92.

As was mentioned previously, the transformation that yields the transformed audio information from the audio signal may result in the coefficient related to energy being a complex number. In such implementations, the complex number for the coefficient generated by the transform may be preserved. In such implementations, for example, the real and imaginary portions of the coefficient may be analyzed separately, at least at first. By way of illustration, plot 90 may represent the real portion of the coefficient, and a separate plot (not shown) may represent the imaginary portion of the coefficient as a function of frequency. The plot representing the imaginary portion of the coefficient as a function of frequency may have spikes at the harmonics of the harmonic sound that corresponds to spikes 92.

Referring back to FIG. 1, tone likelihood module 24 may be configured to determine, from the transformed audio information, a tone likelihood metric as a function of frequency for the audio signal within a time sample window. The tone likelihood metric for a given frequency may indicate the likelihood that a sound represented by the transformed audio information has a tone at the given frequency during the time sample window. A "tone" as used herein may refer to a harmonic (or overtone) of a harmonic sound, or a tone of a non-harmonic sound.

Referring back to FIG. 5, in plot 90 of the transformed audio information, a tone may be represented by a spike in the coefficient, such as any one of spikes 92, 94, and/or 96. As such, a tone likelihood metric for a given frequency may indicate the likelihood of a spike in plot 90 at the given frequency that represents a tone in the audio signal at the given frequency within the time sample window corresponding to plot 90.

Determination of the tone likelihood metric for a given frequency may be based on a correlation between the transformed audio information at and/or near the given frequency and a peak function having its center at the given frequency. The peak function may include a Gaussian peak function, a $\chi^2$ distribution, and/or other functions. The correlation may include determination of the dot product of the normalized peak function and the normalized transformed audio information at and/or near the given frequency. The dot product may be multiplied by −1, to indicate a likelihood of a peak centered on the given frequency, as the dot product alone may indicate a likelihood that a peak centered on the given frequency does not exist.

By way of illustration, FIG. 5 further shows an exemplary peak function 98. The peak function 98 may be centered on a central frequency $\lambda_k$. The peak function 98 may have a peak height (h) and/or width (w). The peak height and/or width may by parameters of the determination of the tone likelihood metric. To determine the tone likelihood metric, the central frequency may be moved along the frequency of the transformed audio information from some initial central frequency $\lambda_0$, to some final central frequency $\lambda_n$. The increment by which the central frequency of peak function 98 is moved between the initial central frequency and the final central frequency may be a parameter of the determination. One or more of the peak height, the peak width, the initial central frequency, the final central frequency, the increment of movement of the central frequency, and/or other parameters of the determination may be fixed, set based on user input, tune (e.g., automatically and/or manually) based on the expected width of peaks in the transformed audio data, the range of tone frequencies being considered, the spacing of frequencies in the transformed audio data, and/or set in other ways.

Figure 6:
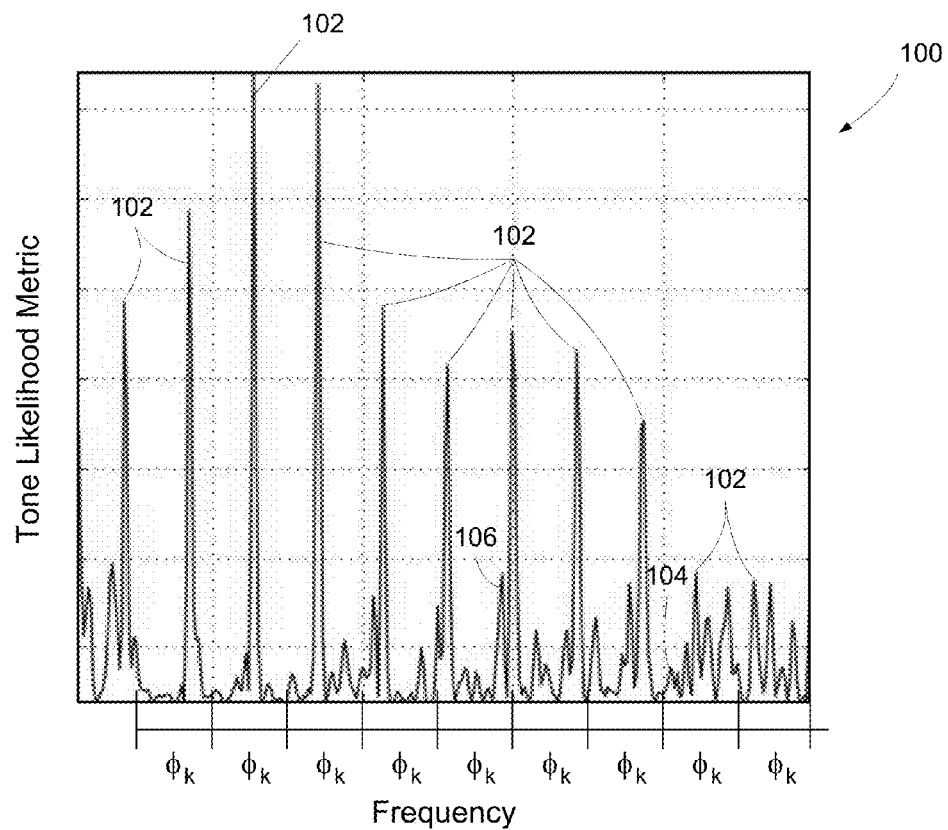
FIG. 6 illustrates a plot of a tone likelihood metric versus frequency.

Determination of the tone likelihood metric as a function of frequency may result in the creation of a new representation of the data that expresses a tone likelihood metric as a function of frequency. By way of illustration, FIG. 6 illustrates a plot 100 of the tone likelihood metric for the transformed audio information shown in FIG. 5 as a function of frequency. As can be seen in FIG. 5 may include spikes 102 corresponding to spikes 92 in FIG. 5, and FIG. 6 may include spikes 104 and 106 corresponding to spikes 94 and 96, respectively, in FIG. 5. In some implementations, the magnitude of the tone likelihood metric for a given frequency may not correspond to the amplitude of the coefficient related to energy for the given frequency specified by the transformed audio information. Instead, the tone likelihood metric may indicate the likelihood of a tone being present at the given frequency based on the correlation between the transformed audio information at and/or near the given frequency and the peak function. Stated differently, the tone likelihood metric may correspond more to the salience of a peak in the transformed audio data than to the size of that peak.

Referring back to FIG. 1, in implementations in which the coefficient representing energy is a complex number, and the real and imaginary portions of the coefficient are processed separately by tone likelihood module 24 as described above with respect to FIGS. 5 and 6, tone likelihood module 24 may determine the tone likelihood metric by aggregating a real tone likelihood metric determined for the real portions of the coefficient and an imaginary tone likelihood metric determined for the imaginary portions of the coefficient (both the real and imaginary tone likelihood metrics may be real numbers). The real and imaginary tone likelihood metrics may then be aggregated to determine the tone likelihood metric. This aggregation may include aggregating the real and imaginary tone likelihood metric for individual frequencies to determine the tone likelihood metric for the individual frequencies. To perform this aggregation, tone likelihood module 24 may include one or more of a logarithm sub-module (not shown), an aggregation sub-module (not shown), and/or other sub-modules.

The logarithm sub-module may be configured to take the logarithm (e.g., the natural logarithm) of the real and imaginary tone likelihood metrics. This may result in determination of the logarithm of each of the real tone likelihood metric and the imaginary tone likelihood metric as a function of frequency. The aggregation sub-module may be configured to sum the real tone likelihood metric and the imaginary tone likelihood metric for common frequencies (e.g., summing the real tone likelihood metric and the imaginary tone likelihood metric for a given frequency) to aggregate the real and imaginary tone likelihood metrics. This aggregation may be implemented as the tone likelihood metric, the exponential function of the aggregated values may be taken for implementation as the tone likelihood metric, and/or other processing may be performed on the aggregation prior to implementation as the tone likelihood metric.

The pitch likelihood module 26 may be configured to determine, based on the determination of tone likelihood metrics by tone likelihood module 24, a pitch likelihood metric as a function of pitch for the audio signal within the time sample window. The pitch likelihood metric for a given pitch may be related to the likelihood that a sound represented by the audio signal has the given pitch during the time sample window. The pitch likelihood module 26 may be configured to determine the pitch likelihood metric for a given pitch by aggregating the tone likelihood metric determined for the tones that correspond to the harmonics of the given pitch.

By way of illustration, referring back to FIG. 6, for a pitch $\phi_k$, the pitch likelihood metric may be determined by aggregating the tone likelihood metric at the frequencies at which harmonics of a sound having a pitch of $\phi_k$ would be expected. To determine pitch likelihood metric as a function of pitch, $\phi_k$ may be incremented between an initial pitch $\phi_0$, and a final pitch $\phi_n$. The initial pitch, the final pitch, the increment between pitches, and/or other parameters of this determination may be fixed, set based on user input, tune (e.g., automatically and/or manually) based on the desired resolution for the pitch estimate, the range of anticipated pitch values, and/or set in other ways.

Returning to FIG. 1, in order to aggregate the tone likelihood metric to determine the pitch likelihood metric, pitch likelihood module 26 may include one or more of a logarithm sub-module, an aggregation sub-module, and/or other sub-modules.

The logarithm sub-module may be configured to take the logarithm (e.g., the natural logarithm) of the tone likelihood metrics. In implementations in which tone likelihood module 24 generates the tone likelihood metric in logarithm form (e.g., as discussed above), pitch likelihood module 26 may be implemented without the logarithm sub-module. The aggregation sub-module may be configured to sum, for each pitch (e.g., $\phi_k$, for k=0 through n) the logarithms of the tone likelihood metric for the frequencies at which harmonics of the pitch would be expected (e.g., as represented in FIG. 6 and discussed above). These aggregations may then be implemented as the pitch likelihood metric for the pitches.

Figure 7:
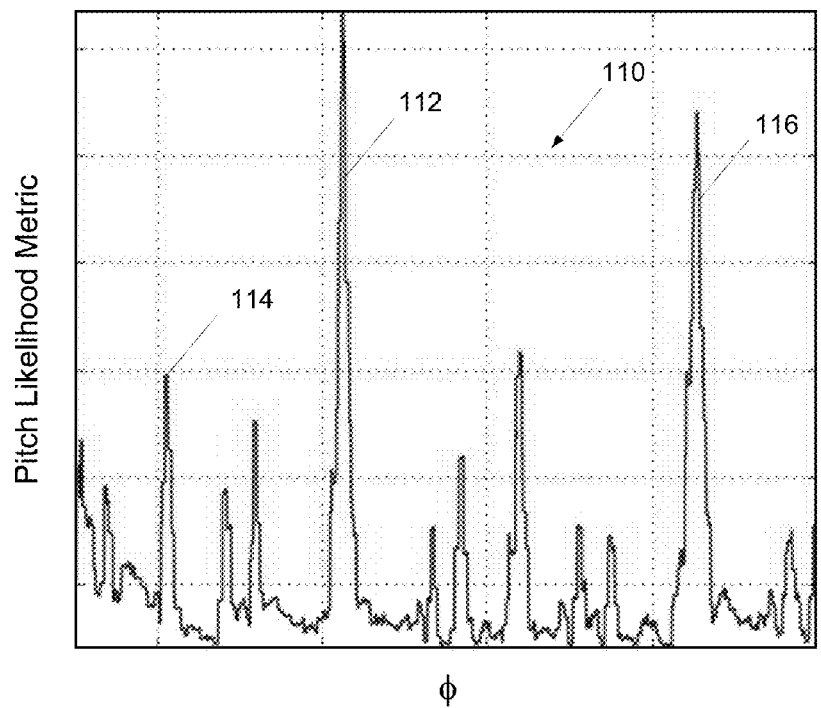
FIG. 7 illustrates a plot of a pitch likelihood metric versus pitch.

Operation of pitch likelihood module 26 may result in a representation of the data that expresses the pitch likelihood metric as a function of pitch. By way of illustration, FIG. 7 depicts a plot 110 of pitch likelihood metric as a function of pitch for the audio signal within the time sample window. As can be seen in FIG. 7, at a pitch represented in the transformed audio information within the time sample window, a global maximum 112 in pitch likelihood metric may develop. Typically, because of the harmonic nature of pitch, local maxima may also develop at half the pitch of the sound (e.g., maximum 114 in FIG. 7) and/or twice the pitch of the sound (e.g., maximum 116 in FIG. 7).

As was mentioned above, in some implementations, the transformed audio information may have been transformed to the frequency-chirp domain. In such implementations, the transformed audio information may be viewed as a plurality of sets of transformed audio information that correspond to separate fractional chirp rates (e.g., separate one-dimensional slices through the two-dimensional frequency-chirp domain, each one-dimensional slice corresponding to a different fractional chirp rate). These sets of transformed audio information may be processed separately by modules 24 and/or 26 illustrated in FIG. 1, and then recombined into a space parameterized by pitch, pitch likelihood metric, and fractional chirp rate.

Figure 8:
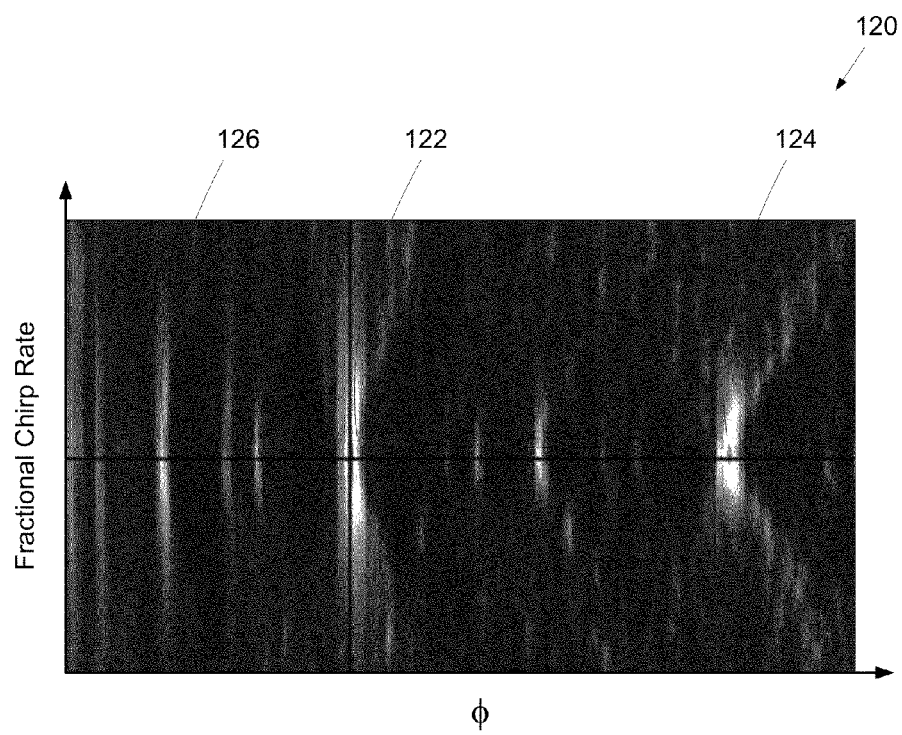
FIG. 8 illustrates a plot of pitch likelihood metric as a function of pitch and fractional chirp rate.

By way of illustration, FIG. 8 shows a space 120 in which pitch likelihood metric may be defined as a function pitch and fractional chirp rate. In FIG. 8, magnitude of pitch likelihood metric may be depicted by shade (e.g., lighter=greater magnitude). As can be seen, maxima for the pitch likelihood metric may be two-dimensional local maxima over pitch and fractional chirp rate. The maxima may include a local maximum 122 at the pitch of a sound represented in the audio signal within the time sample window, a local maximum 124 at twice the pitch, a local maximum 126 at half the pitch, and/or other local maxima.

Figure 9:
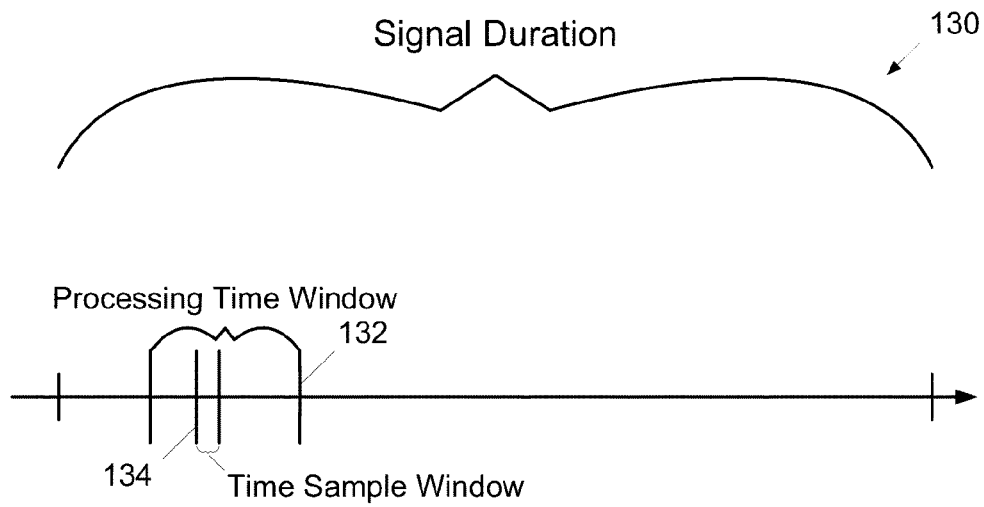
FIG. 9 illustrates a timeline of a signal duration including a defined processing time window and a time sample window within the processing time window.

Referring back to FIG. 1, processing window module 28 may be configured to define a plurality of processing time windows (e.g., across the signal duration). A processing time window may include a plurality of time sample windows. The processing time windows may correspond to a common time length. By way of illustration, FIG. 9 illustrates a timeline 130. Timeline 130 may run the length of the signal duration. A processing time window 132 may be defined over a portion of the signal duration. The processing time window 132 may include a plurality of time sample windows, such as time sample window 134.

Figure 10:
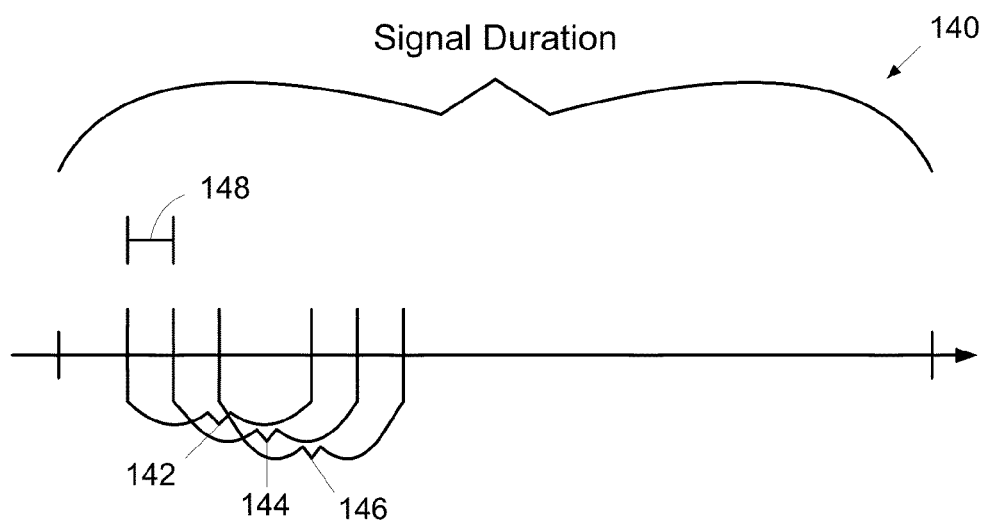
FIG. 10 illustrates a timeline of signal duration including a plurality of overlapping processing time windows.

Referring again to FIG. 1, in some implementations, processing window module 28 may be configured such that the processing time windows may include a plurality of overlapping processing time windows. For example, for some or all of the signal duration, the overlapping processing time windows may be defined by incrementing the boundaries of the processing time windows by some increment. This increment may be an integer number of time sample windows (e.g., 1, 2, 3, and/or other integer numbers). by way of illustration, FIG. 10 shows a timeline 140 depicting a first processing time window 142, a second processing time window 144, and a third processing time window 146, which may overlap. The processing time windows 142, 144, and 146 may be defined by incrementing the boundaries by an increment amount illustrated as 148. The incrementing of the boundaries may be performed, for example, such that a set of overlapping processing time windows including windows 142, 144, and 146 extend across the entirety of the signal duration, and/or any portion thereof.

Turning back to FIG. 1, primary window module 32 may be configured to determine, for a processing time window, a primary time sample window within the processing time window. In some implementations, the primary time sample window may be identified randomly, based on some analysis of pitch likelihood, by rule or parameter, based on user selection, and/or based on other criteria. In some implementations, identifying the primary time sample window may include identifying a maximum pitch likelihood. The time sample window having the maximum pitch likelihood may be identified as the primary time sample window. The maximum pitch likelihood may be the largest likelihood for any pitch and/or chirp rate across the time sample windows within the processing time window. As such, primary window module may be configured to scan the audio information for the time sample windows within the processing time window that specifies the pitch likelihood metric for the time sample windows, and identifying the maximum value for the pitch likelihood within all of these processing time windows.

The pitch estimation module 32 may be configured to determine, for the individual time sample windows in the processing time window, estimated pitch and estimated fractional chirp rate. For the primary time sample window, this may be performed by determining the estimated pitch and the estimated fractional chirp rate randomly, through an analysis of the pitch likelihood metric, by rule, by user selection, and/or based on other criteria. For other time sample windows in the processing time window, the pitch estimation module may be configured to determine estimated pitch and estimated fractional chirp rate by iterating through the processing time window from the primary time sample window and determining the estimated pitch and/or estimated fractional chirp rate for a given time sample window based on one or more of the pitch likelihood metric specified by the transformed audio information for the given time sample window, a predicted pitch for the given time sample window determined based on an estimated pitch and an estimated fractional chirp rate for another time sample window, a correlation between harmonic envelope at different pitches in the given time sample window and the harmonic envelope at an estimated pitch for a time sample window adjacent to the given time sample window, and/or other criteria.

The pitch prediction module 34 may be configured to determine predicted pitch for time sample windows. This may include, for a first time sample window in the processing time window, determining a predicted pitch for the first time sample window. The pitch prediction module may be configured determine the predicted pitch for the first time sample window based on an estimated pitch and an estimated chirp rate previously determined (e.g., by pitch prediction module 34) for a second time sample window. The second time sample window may be adjacent to the first time sample window, near the first time sample window, and/or having other relationships with the first time sample window. The second time sample window may be the primary time sample window, and/or some other time sample window in the processing time window. The second time sample window may come before or after the first time sample window with respect to the timeline of the audio signal.

Determining the predicted pitch for the first time sample window may include, for example, incrementing the pitch from the estimated pitch determined for the second time sample window by an amount that corresponds to the estimated fractional chirp rate determined for the second time sample window and a time difference between the first time sample window and the second time sample window. For example, this determination of a predicted pitch may be expressed mathematically for some implementations as:

$$\phi_{t1} = \phi_{t2} + \Delta t \cdot \frac{d\phi}{dt}; \quad (1)$$

where $\phi_{t1}$ represents the estimated pitch for the first time sample window, $\phi_{t2}$ represents the predicted pitch for the second time sample window, $\Delta t$ represents the time difference between the first time sample window and the second time sample window, and $$\frac{d\phi}{dt}$$

represents an estimated fractional chirp rate of the fundamental frequency of the pitch $\phi_{t2}$ (which can be determined from the estimated fractional chirp rate for the second time sample window).

Harmonic sounds may have a feature referred to herein as "harmonic envelope". By way of illustration, turning back to FIG. 5, the sound represented in plot 90 may have a harmonic envelope 150. The harmonic envelope 150 may be represented by generating a spline through the values of the intensity coefficient at the harmonic frequencies for the pitch of the sound. The coordinates of the envelope vector for the time sample window corresponding to plot 90 at the pitch of the sound corresponding to spikes 92 (and the fractional chirp rate corresponding to plot 90, if applicable) may be designated as the values of the intensity coefficient at two or more of the harmonic frequencies (e.g., at spikes 92). The harmonic frequencies may include two or more of the fundamental frequency through the $n^{th}$ harmonic.

Harmonic envelope 150 may be characterized, at least in part, by an envelope vector. The envelope vector of the sound corresponding to spikes 92 may be defined as a vector having coordinates that correspond to values for the coefficient related to signal intensity at two or more of the harmonic frequencies of the sound (e.g., at two or more of spikes 92).

Referring back to FIG. 1, envelope vector module 36 may be configured to determine envelope vectors within individual time sample windows as a function of pitch and/or fractional chirp rate. For example, for the first time sample window, envelope vector module 36 may determine envelope vectors as a function of pitch and fractional chirp rate. The envelope vector for a given pitch and a given fractional chirp rate in the first time sample window may correspond to the harmonic envelope of sound represented in the audio signal during the first time sample window at the given pitch and the given fractional chirp rate.

The envelope correlation module 38 may be configured to values of a correlation metric for time sample windows as a function of pitch and fractional chirp rate. The values of the correlation metric may indicate correlation between the envelope vector in a time sample window for a specific pitch and fractional chirp rate with the envelope vector in another time sample window for the estimated pitch and estimated fractional chirp rate of the other time sample window. The other time sample window may be, for example, the time sample window having the estimated pitch and estimated fractional chirp rate implemented by pitch prediction module 34 to determine predicted pitch for the time sample window.

For example, envelope correlation module 38 may be configured to determine values of the correlation metric for the first time sample window as a function of pitch and fractional chirp rate based on the envelope vector for the estimated pitch and the estimated fractional chirp rate of the second time sample window. The value of the correlation metric for a given pitch and a given fractional chirp rate in the first time sample window may indicate a level of correlation between the envelope vector for the given pitch and the given fractional chirp rate in the first time sample window and the envelope vector for the estimated pitch and the estimated fractional chirp rate in the second time sample window.

Figure 11:
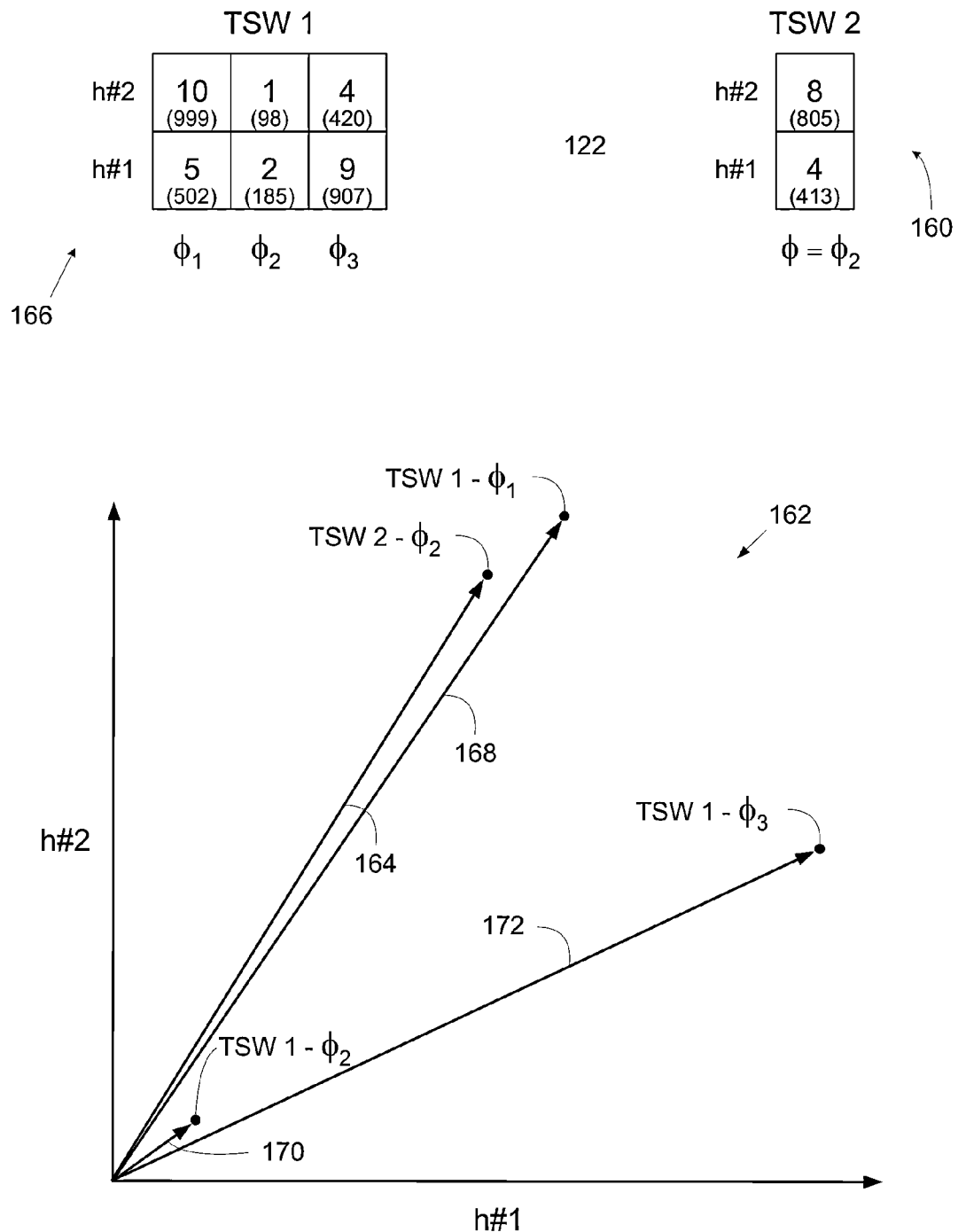
FIG. 11 illustrates a set of envelope vectors.

By way of illustration, FIG. 11 includes a table 160 that represents the values of the intensity coefficient at a first harmonic and a second harmonic of an estimated pitch $\phi_2$ for the second time sample window. In the representation provided by table 160, the intensity coefficient for the first harmonic may be 413, and the intensity coefficient for the second harmonic may be 805. The envelope vector for pitch $\phi_2$ in the second time sample window may be (413, 805). FIG. 11 further depicts a plot 162 of envelope vectors in a first harmonic-second harmonic space. A first envelope vector 164 may represent the envelope vector for pitch $\phi_2$ in the second time window.

FIG. 11 includes a table 166 which may represent the values of the intensity coefficient at a first harmonic and a second harmonic of several pitches ($\phi_1$, $\phi_2$, and $\phi_3$) for the first time sample window. The envelope vector for these pitches may be represented in plot 162 along with first envelope vector 164. These envelope vectors may include a second envelope vector 168 corresponding to pitch $\phi_1$ in the first time sample window, a third envelope vector 170 corresponding to pitch $\phi_2$ in the first time sample window, and a fourth envelope vector 172 corresponding to $\phi_3$ in the first time sample window.

Determination of values of a correlation metric for the first time sample window may include determining values of a metric that indicates correlation between the envelope vectors 168, 170, and 172 for the individual pitches in the first time sample window with the envelope vector 164 for the estimated pitch of the second time sample window. Such a correlation metric may include one or more of, for example, a distance metric, a dot product, a correlation coefficient, and/or other metrics that indicate correlation.

In the example provided in FIG. 11, it may be that during the first time sample window, the audio signal represents two separate harmonic sounds. One at pitch $\phi_1$, and the other at pitch $\phi_3$. Each of these pitches may be offset (in terms of pitch) from the estimated pitch $\phi_1$ in the second time sample window by the same amount. However, it may be likely that only one of these harmonic sounds is the same sound that had pitch $\phi_1$ in the second time sample window. By quantifying a correlation between the envelope vectors of the harmonic sound in the second time sample window separately for the two separate potential harmonic sounds in the first time sample window, system 10 (shown in FIG. 1 and described herein) may reduce the chances that the pitch tracking being performed will jump between sounds at the second time sample window and inadvertently begin tracking pitch for a sound different than the one that was previously being tracked. Other enhancements may be provided by this correlation.

It will be appreciated that the illustration of the envelope vectors in FIG. 11 is exemplary only and not intended to be limiting. For example, in practice, the envelope vectors may have more than two dimensions (corresponding to more harmonic frequencies), may have coordinates with negative values, may not include consecutive harmonic numbers, and/or may vary in other ways. As another example, the pitches for which envelope vectors (and the correlation metric) are determined may be greater than three. Other differences may be contemplated. It will be appreciated that the example provided by FIG. 11, envelope vectors 168, 170, and 172 may be for an individual fractional chirp rate during the second time sample window. Other envelope vectors (and corresponding correlation metrics with pitch $\phi_2$ in the second time sample window) may be determined for pitches $\phi_1$, $\phi_2$, and $\phi_3$ in the first time sample window at other fractional chirp rates.

Turning back to FIG. 1, weighting module 40 may be configured to weight the determinations of pitch likelihood metric for the individual time sample windows. This weighting may be performed based on one or more of predicted pitch determined by pitch prediction module 34, the correlation metric determined by envelope correlation module 38, and/or other parameters.

In implementations in which weighting module 40 is configured to weight based on the predicted pitch determined by pitch estimation module 32, the weighting may apply relatively larger weights to the pitch likelihood metric for pitches in the next time sample window at or near the predicted pitch and relatively smaller weights to the pitch likelihood metric for pitches in the next time sample window that are further away from the predicted pitch. For example, this weighting may include multiplying the pitch likelihood metric by a weighting function that varies as a function of pitch and may be centered on the predicted pitch. The width, the shape, and/or other parameters of the weighting function may be determined based on user selection (e.g., through settings and/or entry or selection), fixed, based on noise present in the audio signal, based on the range of fractional chirp rates in the sample, and/or other factors. As a non-limiting example, the weighting function may be a Gaussian function.

In implementations in which weighting module 40 is configured to weight based on the correlation metric determined by the envelope correlation module 38, relatively larger weights may be applied to the pitch likelihood metric at pitches having values of the correlation metric that indicate relatively high correlation with the envelope vector for the estimated pitch in the other time sample window. The weighting may apply relatively smaller weights to the pitch likelihood metric at pitches having correlation metric values in the next time sample window that indicate relatively low correlation with the envelope vector for the estimated pitch in the other time sample window.

The pitch estimation module 32 may be configured such that for at least some of the time sample windows other than the primary time sample window, an estimated pitch and an estimated fractional chirp rate may be determined from the weighted pitch likelihood metric generated by weighting module 40. For example, pitch estimation module 32 may be configured such that determination of the estimated pitch for the first time sample window may include identifying a maximum in the weighted pitch likelihood metric and determining the pitch and/or fractional chirp rate corresponding to this maximum as the estimated pitch and/or the estimated fractional chirp rate for the first time sample window.

It will be appreciated that as modules 28, 30, 32, 34, 36, 38, and 40 process a plurality of overlapping processing time windows in an iterative fashion, a plurality of estimated pitches and/or estimated fractional chirp rates may be determined for individual time sample windows that lie within two or more of the overlapping processing time windows. The estimated fractional chirp rates and/or estimated fractional chirp rates determined for an individual time sample window may not all be the same, as different pitch paths through the different processing time windows may result in discrepancies. Estimated pitch aggregation module 42 may be configured to aggregate, over individual time sample windows determinations of estimated pitch and/or estimated fractional chirp rate. By way of non-limiting example, determining an aggregated estimated pitch for a given time sample window may include determining a mean estimated pitch, determining a median estimated pitch, selecting an estimated pitch that was determined most often for the time sample window, and/or other aggregation techniques. The estimated pitch aggregation module 42 may be configured such that the determination of a mean, a selection of a determined estimated pitch, and/or other aggregation techniques may be weighted. For example, the individually determined estimated pitches for the given time sample window may be weighted according to their corresponding pitch likelihood metrics. These pitch likelihood metrics may include the pitch likelihood metrics determined by pitch likelihood module 26, the weighted pitch likelihood metric determined for the given time sample window by weighting module 40, and/or other pitch likelihood metrics for the given time sample window.

The voiced section module 44 may be configured to divide individual time sample windows into voiced and unvoiced categories. The voiced time sample windows may be time sample windows during which the sounds represented in the audio signal are harmonic or "voiced" (e.g., spoken vowel sounds). The unvoiced time sample windows may be time sample windows during which the sounds represented in the audio signal are not harmonic or "unvoiced" (e.g., spoken consonant sounds).

In some implementations, voiced section module 44 may be configured to make this determination based on a harmonic energy ratio. The harmonic energy ratio for a given time sample window may be determined based on the transformed audio information for given time sample window. The harmonic energy ratio may be determined as the ratio of the sum of the magnitudes of the coefficient related to energy at the harmonics of the estimated pitch (or aggregated estimated pitch) in the time sample window to the sum of the magnitudes of the coefficient related to energy at the harmonics across the spectrum for the time sample window. The transformed audio information implemented in this determination may be specific to an estimated fractional chirp rate (or aggregated estimated fractional chirp rate) for the time sample window (e.g., a slice through the frequency-chirp domain along a common fractional chirp rate). The transformed audio information implemented in this determination may not be specific to a particular fractional chirp rate.

For a given time sample window if the harmonic energy ratio is above some threshold value, a determination may be made by voiced section module 44 that the audio signal during the time sample window represents voiced sound. If, on the other hand, for the given time sample window the harmonic energy ratio is below the threshold value, a determination may be made that the audio signal during the time sample window represents unvoiced sound. The threshold value may be determined, for example, based on user selection (e.g., through settings and/or entry or selection), fixed, based on noise present in the audio signal, based on the fraction of time the harmonic source tends to be active (e.g. speech has pauses), and/or other factors.

In some implementations, voiced section module 44 may be configured to divide individual time sample windows based on the pitch likelihood metric for estimated pitch (or aggregated estimated pitch). For example, for a given time sample window if the pitch likelihood metric is above some threshold value, a determination may be made that the audio signal during the time sample window represents voiced sound. If, on the other hand, for the given time sample window the pitch likelihood metric is below the threshold value, a determination may be made that the audio signal during the time sample window represents unvoiced sound. The threshold value may be determined, for example, based on user selection (e.g., through settings and/or entry or selection), fixed, based on noise present in the audio signal, based on the fraction of time the harmonic source tends to be active (e.g. speech has pauses), and/or other factors.

Responsive to a determination that the audio signal during a time sample window represents unvoiced sound, voiced section module 44 may be configured to set the estimated pitch (or aggregated estimated pitch) for the time sample window to some predetermined value. For example, this value may be set to 0, or some other value. This may cause the tracking of pitch accomplished by system 10 to designate that harmonic speech may not be present or prominent in the time sample window.

The resynthesis module 46 may be configured to resynthesize the audio signal based on individual harmonics and corresponding pitches determined from the transformed audio information (e.g., estimated pitches determined by pitch estimation module 32 and/or estimated pitch aggregation module 42). According to some implementations, resynthesizing the audio signal may include tracking one or more pitches of the sound to estimate individual pitch and corresponding amplitudes as a function of time for sound s. Individual harmonics of a sound may be synthesized using oscillators corresponding to individual harmonics. Synthesizing individual harmonics may include, for a given harmonic, integrating a corresponding pitch over time to determine the unwrapped phase of the given harmonic. Individual ones of the oscillators may be based on a cosine function. The synthesized harmonics may be summed to obtain the resynthesized audio signal.

According to some implementations, the output y as a function of time t of the $i^{th}$ oscillator may be expressed as, or similar to, $$y_i(t) = \cos \int_0^t i\phi(\tau)d\tau$$

where $\phi$ is pitch (first harmonic) as a function of time. This equation may be fixed, so the entire representation of a sound is stored in the pitch and harmonic amplitude parameters. Time courses may be represented sparsely because pitch and envelope (the set of harmonic amplitudes) change slowly per time relative to the sampling rate. For example, a cubic spline with 20 knots may provide an accurate fit to the pitch time course over one second for a human voice. Similarly, the harmonic amplitudes may be represented with about 10 knots along the frequency dimension and per second in time to form an "amplitude surface" (e.g., amplitude as a function of frequency and time, and/or transformed audio information) expressing the changing envelope. Some or all harmonic amplitudes and envelopes for synthesizing consonants with a white noise source may be shaped by such an amplitude surface.

In some implementations, resynthesis module 46 may be configured to solve any phase problems because the audio signal may be built through integration, where phase is a consequence of the audio signal and not something that needs to be factored in. Also, the degree of compression of the resynthesized audio signal may go below a kB per second for voice, which is far better than the current mp3 standard.

The resynthesized audio signal may be built from oscillators and parameters that specify pitch and harmonic amplitudes as a function of time (e.g., the envelope vectors for the estimated pitch determined by envelope vector module 36 for the time sample windows over time). One or more of these parameters may be adjusted independently of the others without altering the phase and without harmonics suddenly dropping out.

In some implementations, individual ones of the oscillators may include a white noise source to simulate a whispered version of the voice that retains word shaping and speech rhythms. Parameters may be altered to adjust for known channel distortions. For example, cell phones vary subtly in their pass-band, but generally have the same approximate high and low roll-offs. A correction may be made by dividing the transformed audio information by the roll-off transfer function.

The noise subtraction module 48 may be configured to subtract noise from the transformed audio information. Subtracting noise may include interpolating across peak points of harmonic pitch paths through the transformed audio information. The peak points may lie along harmonic frequencies in the transformed audio information, and may be determined as a function of frequency and time for a given harmonic. In some implementations, interpolation across the peak points may include polynomial interpolation, use of splines, and/or other interpolation techniques.

Subtracting noise may further include interpolating across trough points of harmonic pitch paths through the transformed audio information. The trough points may be positioned midway between peak points of adjacent harmonic frequencies in the transformed audio information, and may be determined as a function of frequency and time. In some implementations, interpolation across the trough points may include polynomial interpolation, use of splines, and/or other interpolation techniques. Such splines may include linear, quadratic, cubic, and/or other splines. Values associated with individual ones of the trough point interpolations may be subtracted from values associated with individual ones of the peak point interpolations to yield noise-reduced transformed audio information.

The fence model module 50 may be configured to suppress noise between harmonics of the sound in the transformed audio information by centering functions at individual harmonics in the transformed audio information. The functions may serve to suppress noise between the harmonics in order to yield noise-reduced transformed audio information. The width of a given function may be based on a bandwidth of a corresponding harmonic.

In some implementations, individual ones of the functions utilized by fence model module 50 may include a Gaussian function. Such a Gaussian function may be configured to suppress information between the harmonics. The Gaussian function may be configured to replace information associated with individual harmonics with Gaussian (or other) curves to provide noise-reduced transformed audio information. A given Gaussian curve may be fitted to a corresponding harmonic.

An audio signal may be reconstructed from the noise-reduced transformed audio information, as discussed in connection with the reconstruction module 52. Such a reconstructed audio signal may closely resemble the undistorted original audio signal, even down to 3 dB noise. Additionally, the reconstructed audio signal may be more compact relative to the original audio signal because only the harmonic frequencies and corresponding amplitudes need to be transmitted to resynthesize the reconstructed audio signal.

According to some implementations, individual ones of the functions may include a rectangular fence. Such a fence may be configured to zero information between the harmonics while preserving information associated with the harmonics. In some implementations, one or more functions utilized by fence model module 50 may be separately applied to real and imaginary components of the transformed audio information.

The reconstruction module 52 may be configured to reconstruct an audio signal and/or portions of an audio signal (e.g., vowel and/or consonant sounds). In some implementations, one or more reverse transformations may be performed on transformed audio information and/or other non-time-domain information to obtain a reconstructed audio signal. That is, reconstruction may include converting a frequency domain representation and/or frequency-chirp domain representation to a time-domain representation, according to some implementations. The reconstruction module 52 may be configured to reconstruct noise-reduced transformed audio information obtained from noise subtraction module 48, fence model module 50, and/or another source of noise-reduced transformed audio information. A reverse transformation used by reconstruction module 52 may correspond to a reverse and/or inverse of a transform performed on the original audio signal to produce the transformed audio information.

The audio features module 54 may be configured to obtain features associated with the audio signal from the transformed audio information. One or more separate features may correspond to individual methods and/or techniques of obtaining the features such as, for example, the methods and/or techniques described in connection with information reduction module 56, spectral slope module 58, and/or elsewhere herein. A feature may include a set of numbers that determine a vector, for individual segments of the audio signal, in a feature space. The feature space may be a multi-dimensional space where each dimension corresponds to one component (dimension) of the feature vector. Feature vectors corresponding to two or more methods and/or techniques of obtaining features may be combined (e.g., by vector summation) as an aggregate feature vector. Individual feature vectors and/or the aggregate feature vector may be used in the feature space for segmentation and/or classification.

According to some implementations, the features may include reduced transformed audio information, spectral slope information, mel-frequency cepstral coefficient vectors, harmonic amplitude vectors, harmonic amplitude surfaces, pitched harmonic amplitude surfaces, time derivatives of the harmonic amplitude surfaces, Gabor transforms of the fractional harmonic derivatives, and/or other features. In some implementations, a separate harmonic amplitude vector may correspond to individual time windows. Harmonic amplitude surfaces may be defined over multiple time windows (e.g., about 200 msec or 20 time windows). Pitched harmonic amplitude surfaces may have time-corresponding pitch values appended to the amplitude surface feature vector. Time derivatives of the harmonic amplitude surfaces may be normalized for harmonic amplitude (e.g., fractional harmonic derivatives). Gabor transforms of the fractional harmonic derivatives may serve to compress features information.

Individual features may be associated with a feature score relative to a predetermined speaker model. A speaker model may include a set of speech characteristics and/or other speech information unique to a specific person, a group of people, and/or other source of audible speech. A feature score may facilitate a comparison between a corresponding feature to one or more speech characteristics of a speaker model.

The information reduction module 56 may be configured to obtain reduced transformed audio information as a feature associated with the audio signal. For example, a harmonic of a sound may be described as a vector defined as function of time. Such a vector may be one-dimensional, two-dimensional, or three-dimensional, or may have another dimensionality. According to some implementations, a one-dimensional vector may describe frequency versus time, amplitude versus time, chirp rate versus time, and/or other information. A two-dimensional vector may describe frequency and amplitude versus time, frequency and chirp rate versus time, amplitude and chirp rate versus time, and/or other information. A three-dimensional vector may describe frequency, chirp rate, and amplitude versus time, and/or other information. Such information may be determined over the span of a portion of the audio signal (e.g., the span of one vowel), a fixed time span (e.g., 200 msec), the entire audio signal, and/or another duration of time.

Obtaining the reduced transformed audio information may include determining an amplitude value for individual harmonics at individual time windows. The amplitude value may correspond to a magnitude of a coefficient related to energy amplitude of a given harmonic at a given time. The reduced transformed audio information may be constructed using single points that correspond to the harmonic positions for individual time windows. Those points may describe the center frequency, chirp rate, time position, amplitude (or some other coefficient related to signal intensity) value, and/or other information for individual harmonics. In some implementations, values within the reduced transformed audio information between the amplitude values may be set to zero. A filter bank may be applied to the reduced transformed audio information. The filter bank may include one or more mel filters and/or other filters.

The spectral slope module 58 may be configured to obtain spectral slope information based on the transformed audio information as a feature associated with the audio signal. In some implementations, obtaining the spectral slope information may include determining an instantaneous slope of the harmonic envelope (e.g., harmonic envelope 150 shown in FIG. 5 and described above) as a function of frequency. In some implementations, instantaneous slope of the transformed audio information may include a frequency-derivative of the coefficient related to signal intensity as a function of time. Instantaneous slope may be determined by taking, at a given time, the derivative over frequency of the coefficient related to energy amplitude of the transformed audio information. A filter bank may be applied to the spectral slope information. The filter bank may include one or more mel filters and/or other filters.

The noise estimator module 60 may be configured to obtain an SNR estimation as a time-varying quantity associated with the audio signal (e.g., for individual time sample windows of the audio signal). In accordance with some implementations, obtaining the SNR estimation may include determining the harmonic energy ratio. In some implementations, the ratio may be averaged over time. The noise estimator module 60 may be configured to compare a determined harmonic energy ratio to a threshold value.

Several considerations may exist in determining the threshold. For example, setting a specific threshold may result in a specific ratio of time when the ratio between harmonic energy and total energy breaches the threshold (e.g., voice is "on") versus time when the ratio does not breach the threshold (e.g., voice is "off"). The threshold value may be selected such that the ratio of time (e.g., (voice on)/(voice off)) equals an average for a given classification of speaker (e.g., by nationality, gender, age, and/or other speaker classifications) being considered. As another exemplary consideration, for a given classification procedure, a quantity VLL may be derived that equals a variance of log-likelihood ratios across a plurality of speaker models. Regardless of a final decision as to selected speaker or that there is no match, the VLL may tend to be greater when non-voiced time segments are included in the classification. Therefore, the threshold may be adjusted to minimize the VLL.

The aggregate score module 62 may be configured to obtain an aggregate classification score based on the feature scores according to a weighting scheme. The weighting scheme may be associated with a noise and/or SNR estimation. The aggregate classification score may be used to determine a likely speaker model to identify a source of the sound in the audio signal. In some implementations, aggregate score module 62 may be configured to obtain the aggregate classification score by summing weighted feature scores of one or more features obtained by audio features module 54. The weighting performed on the individual feature scores may be performed such that for a given audio signal, the features scores more likely to be accurate are weighted with relatively larger weights. Likelihood of accuracy, and hence feature score weighting, may be determined based on, for example, noise level, acoustic setting in which the audio signal was acquired, language being spoken, and/or other factors.

In accordance with some implementations, an aggregate classification score may be determined for individual speaker models of a set of speaker models. A speaker within the audio signal may be identified based on the aggregates scores of the speaker models in the set. For example, a speaker associated with a speaker model having the maximum aggregate classification score of the set may be identified as the speaker in the audio signal. In some implementations, an aggregate classification score 2 may be expressed as $$\hat{z}_j = \sum_i c_i z_{ij},$$

where $z_{ij}$ is the feature score from the $i^{th}$ method pertaining to the $j^{th}$ speaker and/or speaker model, and $c_i$ is a positive real weighting coefficient associated with a noise estimate of the $i^{th}$ method. The $i^{th}$ method may correspond to methods described in connection with FIGS. 19 and 20, methods performed by audio features module 54 and/or other modules, and/or other methods for obtaining features associated with the audio signal.

The training module 64 may be configured to determine the weighing scheme utilized by aggregate score module 62. In accordance with some implementations, training module 64 may perform training operations on the audio signal and/or other information related to the audio signal to determine characteristics of the audio signal and/or conditions pertaining to the recording of the audio signal (e.g., type of microphone, closed room versus open air, and/or other conditions) that indicate a particular set of score weights that results in more accurate classification compared to other weighting schemes.

Processor 12 may be configured to provide information processing capabilities in system 10. As such, processor 12 may include one or more of a digital processor, an analog processor, a digital circuit designed to process information, an analog circuit designed to process information, a state machine, and/or other mechanisms for electronically processing information. Although processor 12 is shown in FIG. 1 as a single entity, this is for illustrative purposes only. In some implementations, processor 12 may include a plurality of processing units. These processing units may be physically located within the same device, or processor 12 may represent processing functionality of a plurality of devices operating in coordination (e.g., "in the cloud", and/or other virtualized processing solutions).

It should be appreciated that although modules 18, 20, 22, 24, 26, 28, 30, 32, 34, 36, 38, 40, 42, 44, 46, 48, 50, 52, 54, 56, 58, 60, 62, and 64 are illustrated in FIG. 1 as being co-located within a single processing unit, in implementations in which processor 12 includes multiple processing units, one or more of modules 18, 20, 22, 24, 26, 28, 30, 32, 34, 36, 38, 40, 42, 44, 46, 48, 50, 52, 54, 56, 58, 60, 62, and/or 64 may be located remotely from the other modules. The description of the functionality provided by the different modules 18, 20, 22, 24, 26, 28, 30, 32, 34, 36, 38, 40, 42, 44, 46, 48, 50, 52, 54, 56, 58, 60, 62, and/or 64 described below is for illustrative purposes, and is not intended to be limiting, as any of modules 18, 20, 22, 24, 26, 28, 30, 32, 34, 36, 38, 40, 42, 44, 46, 48, 50, 52, 54, 56, 58, 60, 62, and/or 64 may provide more or less functionality than is described. For example, one or more of modules 18, 20, 22, 24, 26, 28, 30, 32, 34, 36, 38, 40, 42, 44, 46, 48, 50, 52, 54, 56, 58, 60, 62, and/or 64 may be eliminated, and some or all of its functionality may be provided by other ones of modules 18, 20, 22, 24, 26, 28, 30, 32, 34, 36, 38, 40, 42, 44, 46, 48, 50, 52, 54, 56, 58, 60, 62, and/or 64. As another example, processor 12 may be configured to execute one or more additional modules that may perform some or all of the functionality attributed below to one of modules 18, 20, 22, 24, 26, 28, 30, 32, 34, 36, 38, 40, 42, 44, 46, 48, 50, 52, 54, 56, 58, 60, 62, and/or 64.

Electronic storage 14 may comprise electronic storage media that stores information. The electronic storage media of electronic storage 14 may include one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 14 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 14 may include virtual storage resources, such as storage resources provided via a cloud and/or a virtual private network. Electronic storage 14 may store software algorithms, information determined by processor 12, information received via user interface 16, and/or other information that enables system 10 to function properly. Electronic storage 14 may be a separate component within system 10, or electronic storage 14 may be provided integrally with one or more other components of system 10 (e.g., processor 12).

User interface 16 may be configured to provide an interface between system 10 and users. This may enable data, results, and/or instructions and any other communicable items, collectively referred to as "information," to be communicated between the users and system 10. Examples of interface devices suitable for inclusion in user interface 16 include a keypad, buttons, switches, a keyboard, knobs, levers, a display screen, a touch screen, speakers, a microphone, an indicator light, an audible alarm, and a printer. It is to be understood that other communication techniques, either hard-wired or wireless, are also contemplated by the present invention as user interface 16. For example, the present invention contemplates that user interface 16 may be integrated with a removable storage interface provided by electronic storage 14. In this example, information may be loaded into system 10 from removable storage (e.g., a smart card, a flash drive, a removable disk, etc.) that enables the user(s) to customize the implementation of system 10. Other exemplary input devices and techniques adapted for use with system 10 as user interface 14 include, but are not limited to, an RS-232 port, RF link, an IR link, modem (telephone, cable or other). In short, any technique for communicating information with system 10 is contemplated by the present invention as user interface 14.

Figure 12:
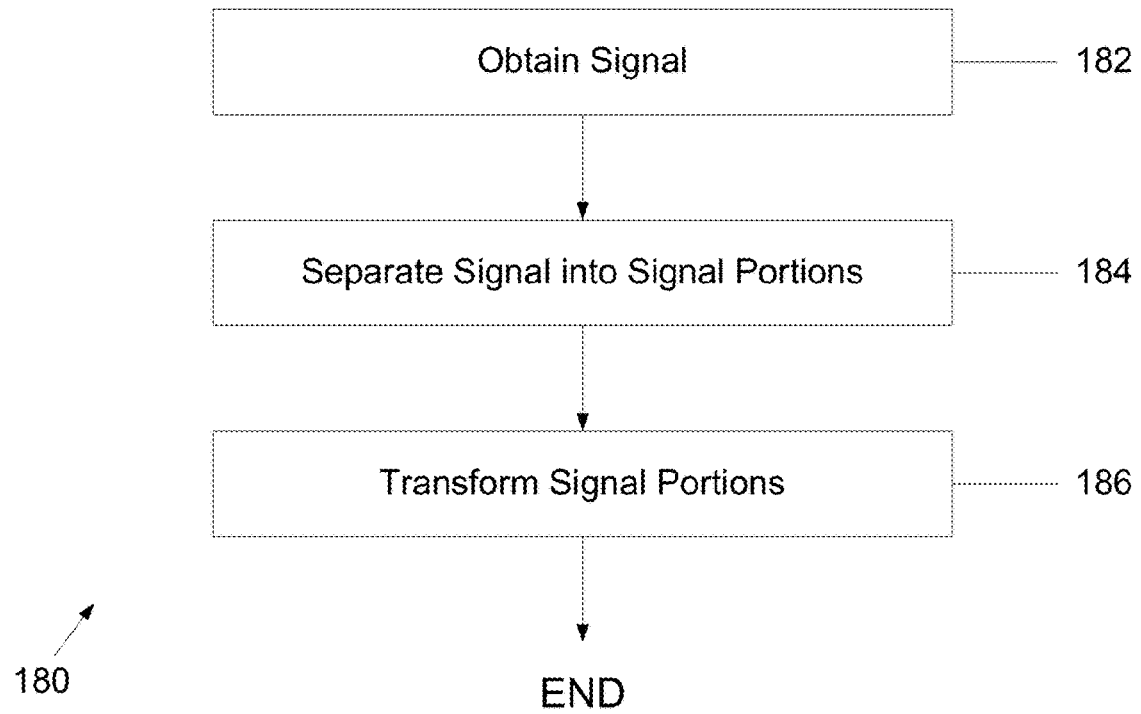
FIG. 12 illustrates a method of processing audio information.

FIG. 12 illustrates a method 180 of processing a sound signal. At an operation 182, a sound signal may be obtained. The sound signal may be obtained from electronic storage, from a user interface, and/or from other sources. The sound signal may include an electronic analog and/or a digital signal that represents sounds generated by sources and/or noise. The sound signal may specify an amplitude as a function of time. The sound signal may have a sampling rate at which amplitude/frequency are represented. The sampling rate may correspond to a sampling period. In some implementations, operation 182 may be performed by a signal module that is the same as or similar to signal module 18 (shown in FIG. 1 and described herein).

At an operation 184, the sound signal may be separated into a set of signal portions. The signal portions may be associated with individual time sample windows. The time sample windows may be consecutive across time, may overlap, may be spaced apart, and/or may be arranged over time in other ways. An individual time sample window may correspond to a period of time that is greater than the sampling period of the sound signal being separated into signal portions. As such, the signal portion associated with a time sample window may include a plurality of signal samples. In some implementations, operation 184 may be performed by a time window module that is the same as or similar to time window module 20 (shown in FIG. 1 and described herein).

At an operation 186, the signal portions may be transformed into the frequency-chirp domain. The frequency-chirp domain may be given by frequency and (fractional) chirp rate. The frequency-chirp domain may have a co-domain (output) given by the transform coefficient. The chirp rate variable may be a metric derived from chirp rate (e.g., or rate of change in frequency). As such, upon performance of the transform at operation 186, a transformed signal portion may specify a transform coefficient as a function of frequency and fractional chirp rate for the time window associated with the transformed signal portion. In some implementations, operation 186 may be performed by a transform module that is the same as or similar to transform module 22 (shown in FIG. 1 and described herein).

Figure 13:
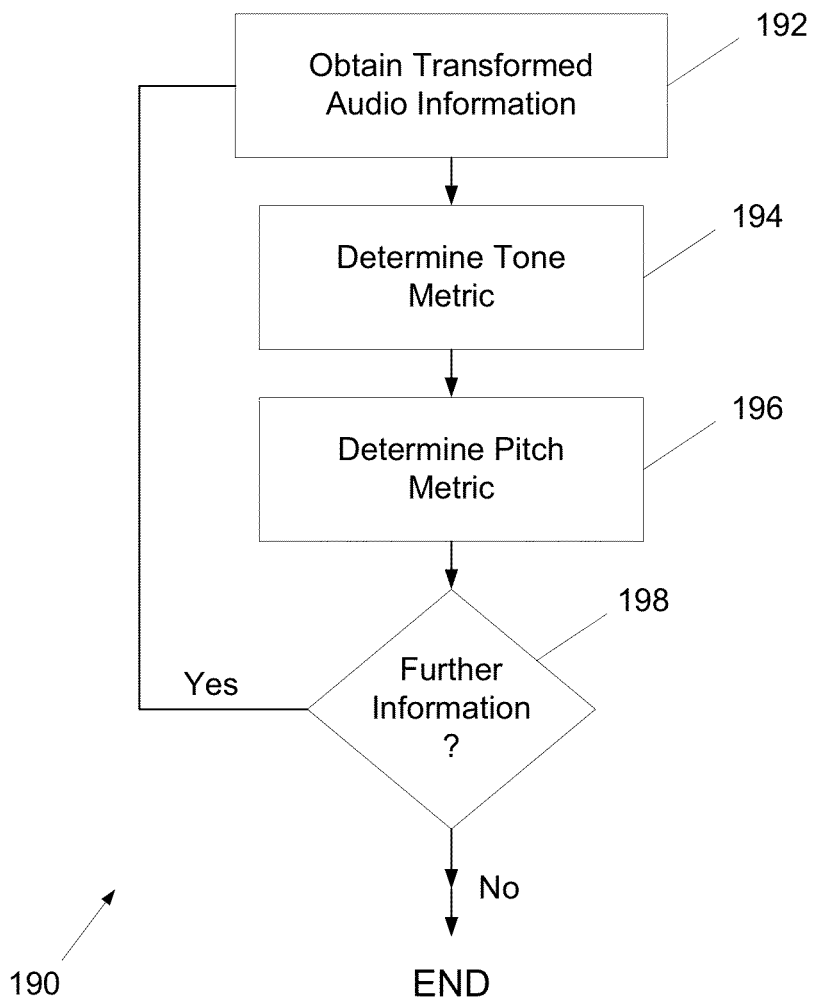
FIG. 13 illustrates a method of analyzing audio information.

FIG. 13 illustrates a method 190 of analyzing audio information. At an operation 192, transformed audio information representing one or more sounds may be obtained. The transformed audio information may specify magnitude of a coefficient related to signal intensity as a function of frequency for an audio signal within a time sample window. In some implementations, operation 192 may include some or all of the operations described herein with respect to operation 180 (shown in FIG. 12 and described above).

At an operation 194, a tone likelihood metric may be determined based on the obtained transformed audio information. This determination may specify the tone likelihood metric as a function of frequency for the audio signal within the time sample window. The tone likelihood metric for a given frequency may indicate the likelihood that a sound represented by the audio signal has a tone at the given frequency during the time sample window. In some implementations, operation 194 may be performed by a tone likelihood module that is the same as or similar to tone likelihood module 24 (shown in FIG. 1 and described above).

At an operation 196, a pitch likelihood metric may be determined based on the tone likelihood metric. Determination of the pitch likelihood metric may specify the pitch likelihood metric as a function of pitch for the audio signal within the time sample window. The pitch likelihood metric for a given pitch may be related to the likelihood that a sound represented by the audio signal has the given pitch. In some implementations, operation 196 may be performed by a pitch likelihood module that is the same as or similar to pitch likelihood module 26 (shown in FIG. 1 and described above).

In some implementations, the transformed audio information may include a plurality of sets of transformed audio information. Individual ones of the sets of transformed audio information may correspond to individual fractional chirp rates. In such implementations, operations 192, 194, and 196 may be iterated for the individual sets of transformed audio information. At an operation 198, a determination may be made as to whether further sets of transformed audio information should be processed. Responsive to a determination that one or more further sets of transformed audio information are to be processed, method 190 may return to operation 192. Responsive to a determination that no further sets of transformed audio information are to be processed (or if the transformed audio information is not divide according to fractional chirp rate), method 190 may end. In some implementations, operation 198 may be performed by a processor that is the same as or similar to processor 12 (shown in FIG. 1 and described above).

Figure 14:
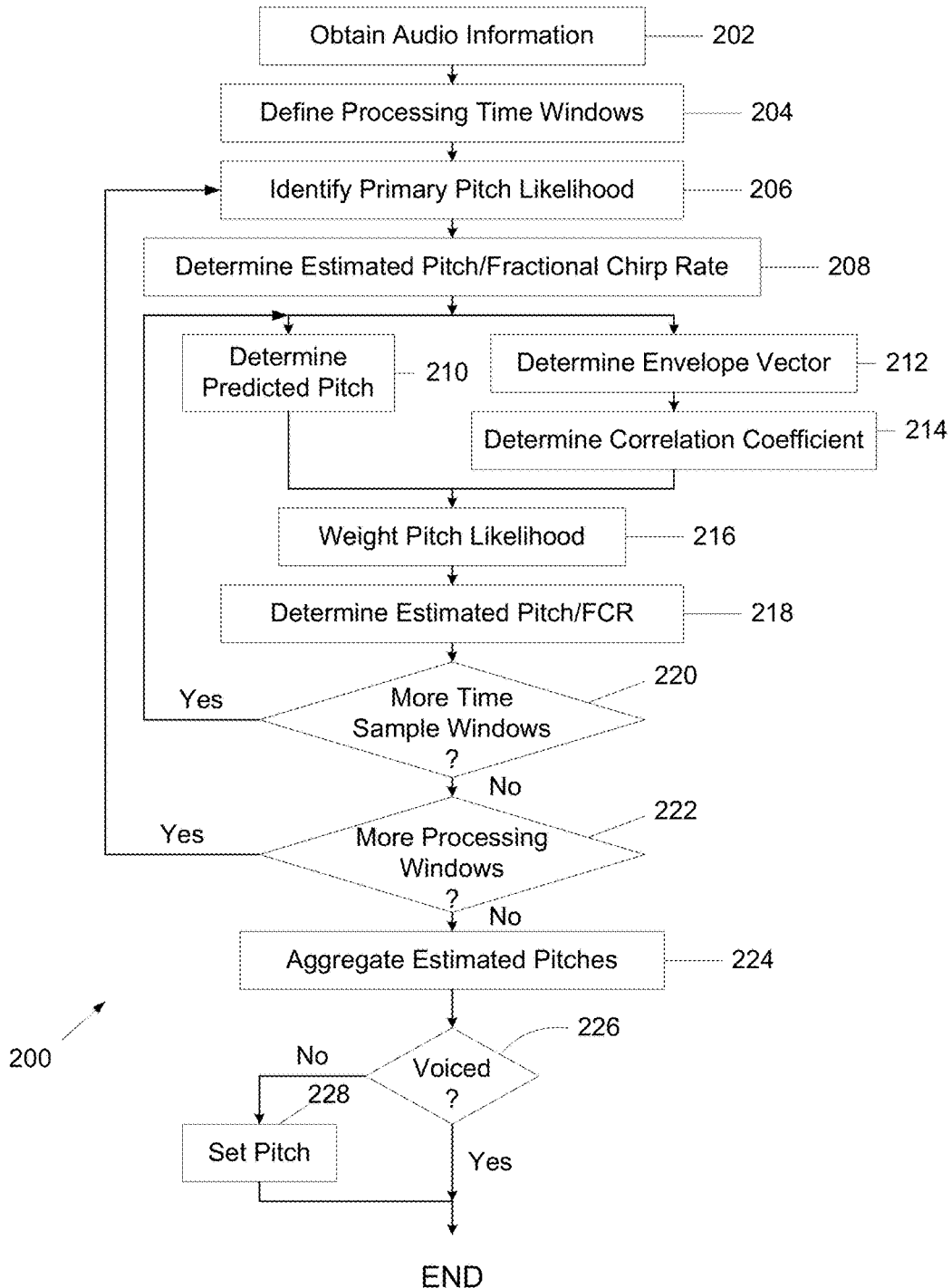
FIG. 14 illustrates a method of analyzing audio information.

FIG. 14 illustrates a method 200 of analyzing audio information related to a sound signal. At an operation 202, audio information derived from an audio signal may be obtained. The audio signal may represent one or more sounds. The audio signal may have a signal duration. The audio information may include audio information that corresponds to the audio signal during a set of discrete time sample windows. The time sample windows may correspond to a period (or periods) of time larger than the sampling period of the audio signal. As a result, the audio information for a time sample window may be derived from and/or represent a plurality of samples in the audio signal. In some implementations, operation 202 may include some or all of the operations described herein with respect to method 180 (shown in FIG. 12 and described above).

At an operation 204, a plurality of processing time windows may be defined across the signal duration. A processing time window may include a plurality of time sample windows. The processing time windows may correspond to a common time length. In some implementations, operation 204 may be performed by a processing window module that is the same as or similar to processing window module 28 (shown in FIG. 1 and described above).

At an operation 206, for a processing time window defined at operation 204, a primary time sample window within the processing time window may be identified. In some implementations, the primary time sample window may be identified randomly, based on some analysis of pitch likelihood, by rule or parameter, based on user selection, and/or based on other criteria. In some implementations, identifying the primary time sample window may include identifying a maximum pitch likelihood. In some implementations, operation 206 may be performed by a primary window module that is the same as or similar to primary window module 30 (shown in FIG. 1 and described above).

At an operation 48, an estimated pitch for the primary time sample window may be determined. In some implementations, the estimated pitch may be selected randomly, based on an analysis of pitch likelihood within the primary time sample window, by rule or parameter, based on user selection, and/or based on other criteria. As was mentioned above, the audio information may indicate, for a given time sample window, the pitch likelihood metric as a function of pitch. As such, the estimated pitch for the primary time sample window may be determined as the pitch for exhibiting a maximum for pitch likelihood metric for the primary time sample window.

As was mentioned above, in the audio information the pitch likelihood metric may further be specified as a function of fractional chirp rate. As such, the pitch likelihood metric may indicate chirp likelihood as a function of the pitch likelihood metric and pitch. At operation 208, in addition to the estimated pitch, an estimated fractional chirp rate for the primary time sample window may be determined. The estimated fractional chirp rate may be determined as the chirp rate corresponding to a maximum for the pitch likelihood metric on the estimated pitch.

At operation 208, an envelope vector for the estimated pitch of the primary time sample window may be determined. As is described herein, the envelope vector for the predicted pitch of the primary time sample window may represent the harmonic envelope of sound represented in the audio signal at the primary time sample window having the predicted pitch. In some implementations, operation 48 may be performed by a pitch estimation module and/or an envelope vector module that are the same as or similar to pitch estimation module 32 and/or envelope vector module 36, respectively (shown in FIG. 1 and described above).

At an operation 210, a predicted pitch for a next time sample window in the processing time window may be determined. This time sample window may include, for example, a time sample window that is adjacent to the time sample window having the estimated pitch and estimated fractional chirp rate determined at operation 210. The description of this time sample window as "next" is not intended to limit the this time sample window to an adjacent or consecutive time sample window (although this may be the case). Further, the use of the word "next" does not mean that the next time sample window comes temporally in the audio signal after the time sample window for which the estimated pitch and estimated fractional chirp rate have been determined. For example, the next time sample window may occur in the audio signal before the time sample window for which the estimated pitch and the estimated fractional chirp rate have been determined. In some implementations, operation 201 may be performed by a pitch prediction module that is the same as or similar to pitch prediction module 34 (shown in FIG. 1 and described above).

At an operation 212, an envelope vector may be determined for the next time sample window as a function of pitch within the next time sample window. In some implementations, operation 212 may be performed by an envelope vector module that is the same as or similar to envelope vector module 36 (shown in FIG. 1 and described above).

At an operation 214, values of a correlation metric for the next time sample window may be determined as a function of pitch. In some implementations, operation 214 may be performed by an envelope correlation module that is the same as or similar to envelope correlation module 38 (shown in FIG. 1 and described above).

At an operation 216, for the next time sample window, the pitch likelihood metric may be weighted. This weighting may be performed based on one or more of the predicted pitch determined at operation 210, the correlation metric determined at operation 214, and/or other weightings metrics. In some implementations, operation 216 may be performed by a weighting module that is the same as or similar to weighting module 40 (shown in FIG. 1 and described above).

At an operation 218, an estimated pitch for the next time sample window may be determined based on the weighted pitch likelihood metric for the next sample window. Determination of the estimated pitch for the next time sample window may include, for example, identifying a maximum in the weighted pitch likelihood metric and determining the pitch corresponding to this maximum as the estimated pitch for the next time sample window.

At operation 218, an estimated fractional chirp rate for the next time sample window may be determined. The estimated fractional chirp rate may be determined, for example, by identifying the fractional chirp rate for which the weighted pitch likelihood metric has a maximum along the estimated pitch for the time sample window. In some implementations, operation 218 may be performed by a pitch estimation module that is the same as or similar to pitch estimation module 34 (shown in FIG. 1 and described above).

At operation 220, a determination may be made as to whether there are further time sample windows in the processing time window for which an estimated pitch and/or an estimated fractional chirp rate are to be determined. Responsive to there being further time sample windows, method 200 may return to operations 210 and 212, and operations 210, 212, 214, 216, and/or 218 may be performed for a further time sample window. In this iteration through operations 210, 212, 214, 216, and/or 218, the further time sample window may be a time sample window that is adjacent to the next time sample window for which operations 210, 212, 214, 216, and/or 218 have just been performed. In such implementations, operations 210, 212, 214, 216, and/or 218 may be iterated over the time sample windows from the primary time sample window to the boundaries of the processing time window in one or both temporal directions. During the iteration(s) toward the boundaries of the processing time window, the estimated pitch and estimated fractional chirp rate implemented at operation 210 may be the estimated pitch and estimated fractional chirp rate determined at operation 208, or may be an estimated pitch and estimated fractional chirp rate determined at operation 210 for a time sample window adjacent to the time sample window for which operations 210, 212, 214, 216, and/or 218 are being iterated.

Responsive to a determination at operation 220 that there are no further time sample windows within the processing time window, method 200 may proceed to an operation 222. At operation 222, a determination may be made as to whether there are further processing time windows to be processed. Responsive to a determination at operation 222 that there are further processing time windows to be processed, method 200 may return to operation 206, and may iterate over operations 206, 208, 210, 212, 214, 216, 218, and/or 220 for a further processing time window. It will be appreciate that iterating over the processing time windows may be accomplished in the manner shown in FIG. 14 and described herein, is not intended to be limiting. For example, in some implementations, a single processing time window may be defined at operation 204, and the further processing time window(s) may be defined individually as method 200 reaches operation 222.

Responsive to a determination at operation 222 that there are no further processing time windows to be processed, method 200 may proceed to an operation 224. Operation 224 may be performed in implementations in which the processing time windows overlap. In such implementations, iteration of operations 206, 208, 210, 212, 214, 216, 218, and/or 220 for the processing time windows may result in multiple determinations of estimated pitch for at least some of the time sample windows. For time sample windows for which multiple determinations of estimated pitch have been made, operation 224 may include aggregating such determinations for the individual time sample windows to determine aggregated estimated pitch for individual the time sample windows. In some implementations, operation 224 may be performed by an estimated pitch aggregation module that is the same as or similar to estimated pitch aggregation module 42 (shown in FIG. 1 and described above).

At an operation 226, individual time sample windows may be divided into voiced and unvoiced categories. In some implementations, operation 226 may be performed by a voiced section module that is the same as or similar to voiced section module 44 shown in FIG. 1 and described above).

Responsive to a determination at operation 226 that the audio signal during a time sample window represents unvoiced sound, the estimated pitch (or aggregated estimated pitch) for the time sample window may be set to some predetermined value at an operation 228. For example, this value may be set to 0, or some other value. This may cause the tracking of pitch accomplished by method 200 to designate that harmonic speech may not be present or prominent in the time sample window.

It will be appreciated that the description above of estimating an individual pitch for the time sample windows is not intended to be limiting. In some implementations, the portion of the audio signal corresponding to one or more time sample window may represent two or more harmonic sounds. In such implementations, the principles of pitch tracking above with respect to an individual pitch may be implemented to track a plurality of pitches for simultaneous harmonic sounds without departing from the scope of this disclosure. For example, if the audio information specifies the pitch likelihood metric as a function of pitch and fractional chirp rate, then maxima for different pitches and different fractional chirp rates may indicate the presence of a plurality of harmonic sounds in the audio signal. These pitches may be tracked separately in accordance with the techniques described herein.

Figure 15:
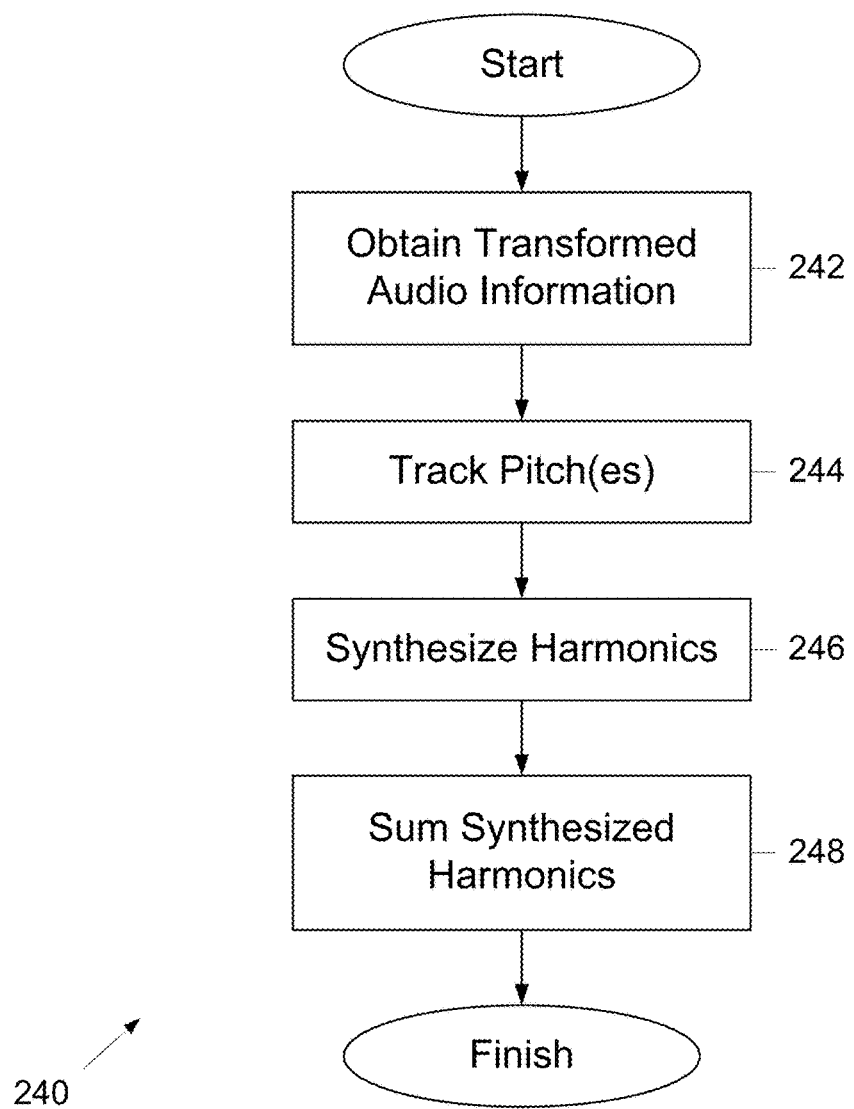
FIG. 15 illustrates a method for reconstructing an audio signal from transformed audio information.

FIG. 15 illustrates a method 240 of analyzing audio information related to an audio signal. At an operation 242, transformed audio information representing a sound may be obtained. The transformed audio information may specify magnitude of a coefficient related to signal intensity as a function of frequency for the audio signal and time. In some implementations, operation 242 may include one or more of the operations of method 180 (shown in FIG. 12 and described above).

At an operation 244, one or more pitches of the sound may be tracked to determine individual pitches and corresponding amplitudes as a function of time for individual harmonics of the sound. In some implementations, operation 244 may include some or all of the operations of method 200 (shown in FIG. 14 and described above).

At an operation 246, individual harmonics may be synthesized using oscillators corresponding to individual harmonics. According to some implementations, only harmonics associated with a desired sound (e.g., speech from a particular speaker) within the original audio signal may be synthesized, thus excluding unwanted sounds. In some implementations, operation 246 may be performed by a resynthesis module that is the same as or similar to resynthesis module 46 (shown in FIG. 1 and described above).

At an operation 248, the synthesized harmonics may be summed to obtain the resynthesized audio signal. In some implementations, operation 248 may be performed by a resynthesis module that is the same as or similar to resynthesis module 46 (shown in FIG. 1 and described above).

Figure 16:
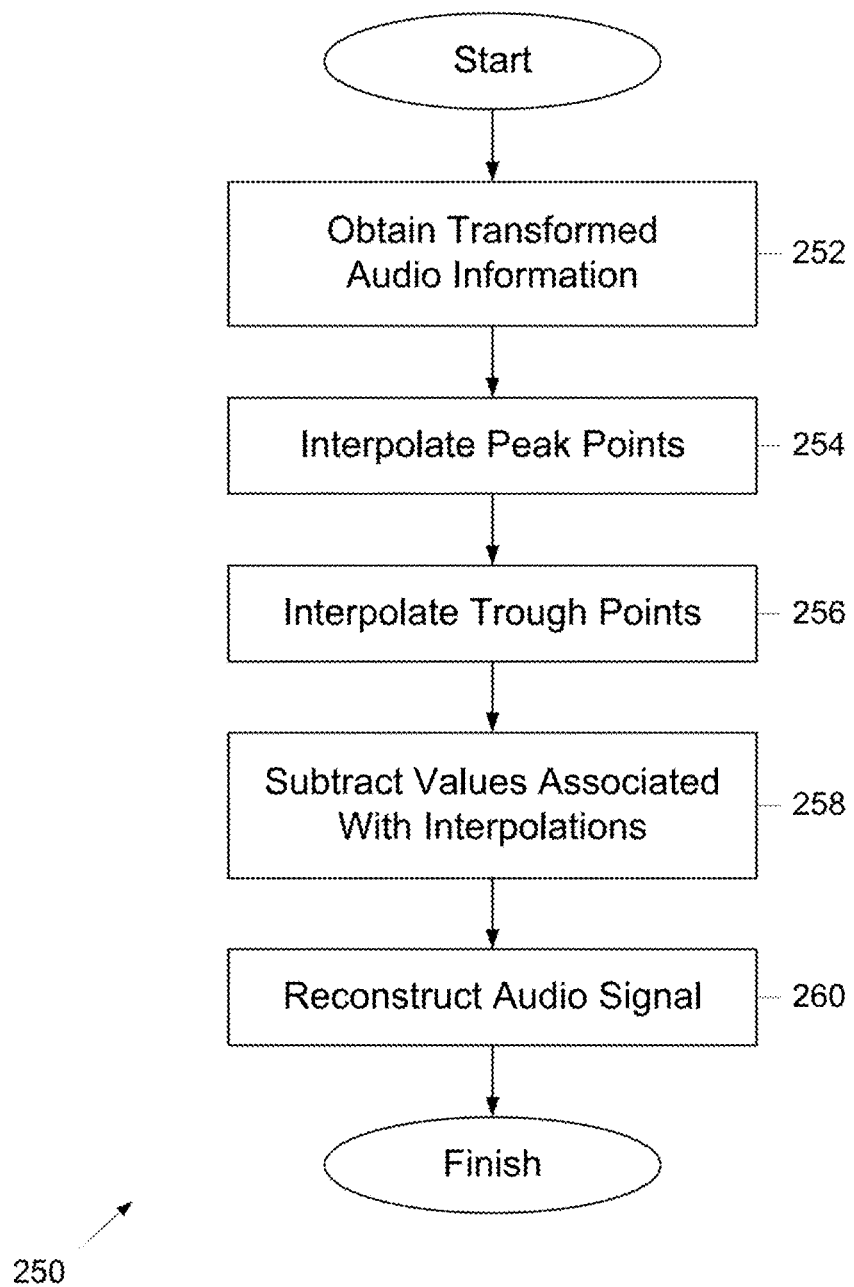
FIG. 16 illustrates a method for reconstructing an audio signal from transformed audio information.

FIG. 16 illustrates a method 250 for reconstructing an audio signal from transformed audio information. At an operation 252, transformed audio information representing a sound may be obtained. The transformed audio information may specify magnitude of a coefficient related to signal intensity as a function of frequency for the audio signal and time. In some implementations, operation 252 may include some or all of the operations of method 180 (shown in FIG. 12 and described above).

At an operation 254, peak points of harmonic pitch paths may be interpolated through the transformed audio information. The peak points may lie along harmonic frequencies in the transformed audio information, and may be determined as a function of frequency and time for a given harmonic. In some implementations, operation 254 may be performed by a noise subtraction module that is the same as or similar to noise subtraction module 48 (shown in FIG. 1 and described above).

At an operation 256, trough points of harmonic pitch paths may be interpolated through the transformed audio information. The trough points may be positioned midway between peak points of adjacent harmonic frequencies in the transformed audio information, and may be determined as a function of frequency and time. In some implementations, operation 256 may be performed by a noise subtraction module that is the same as or similar to noise subtraction module 48 (shown in FIG. 1 and described above).

At an operation 258, values associated with individual ones of the trough point interpolations may be subtracted from values associated with individual ones of the peak point interpolations to yield noise-reduced transformed audio information. In some implementations, operation 258 may be performed by a noise subtraction module that is the same as or similar to noise subtraction module 48 (shown in FIG. 1 and described above).

At an operation 260, the audio signal may be reconstructed based on a reverse transformation of the noise-reduced transformed audio information. In some implementations, operation 260 may be performed by a reconstruction module that is the same as or similar to reconstruction module 52 (shown in FIG. 1 and described above).

Figure 17:
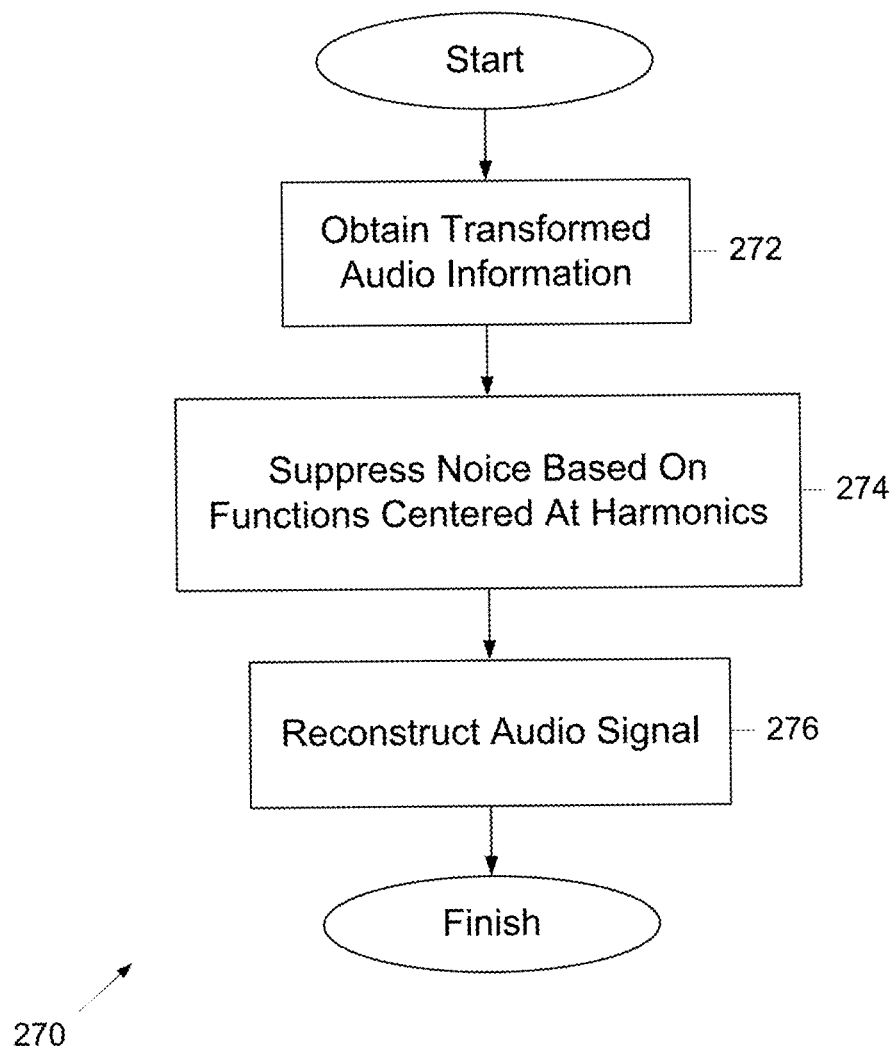
FIG. 17 illustrates a method for reconstructing an audio signal from transformed audio information.

FIG. 17 illustrates a method 270 for reconstructing an audio signal from transformed audio information. At an operation 272, transformed audio information representing a sound may be obtained. The transformed audio information may specify magnitude of a coefficient related to signal energy as a function of frequency for the audio signal and time. In some implementations, operation 272 may include some or all of the operations of method 120 (shown in FIG. 12 and described above).

At an operation 274, noise between harmonics of the sound may be suppressed in the transformed audio information by centering functions at individual harmonics in the transformed audio information. The functions may serve to suppress noise between the harmonics to yield noise-reduced transformed audio information. The width of a given function may be based on a bandwidth of a corresponding harmonic. In some implementations, operation 274 may be performed by a fence model module that is the same as or similar to fence model module 50 (shown in FIG. 1 and described above).

At operation 276, the audio signal may be reconstructed based on a reverse transformation of the noise-reduced transformed audio information. In some implementations, operation 276 may be performed by a reconstruction module that is the same as or similar to reconstruction module 52 (shown in FIG. 1 and described above).

Figure 18:
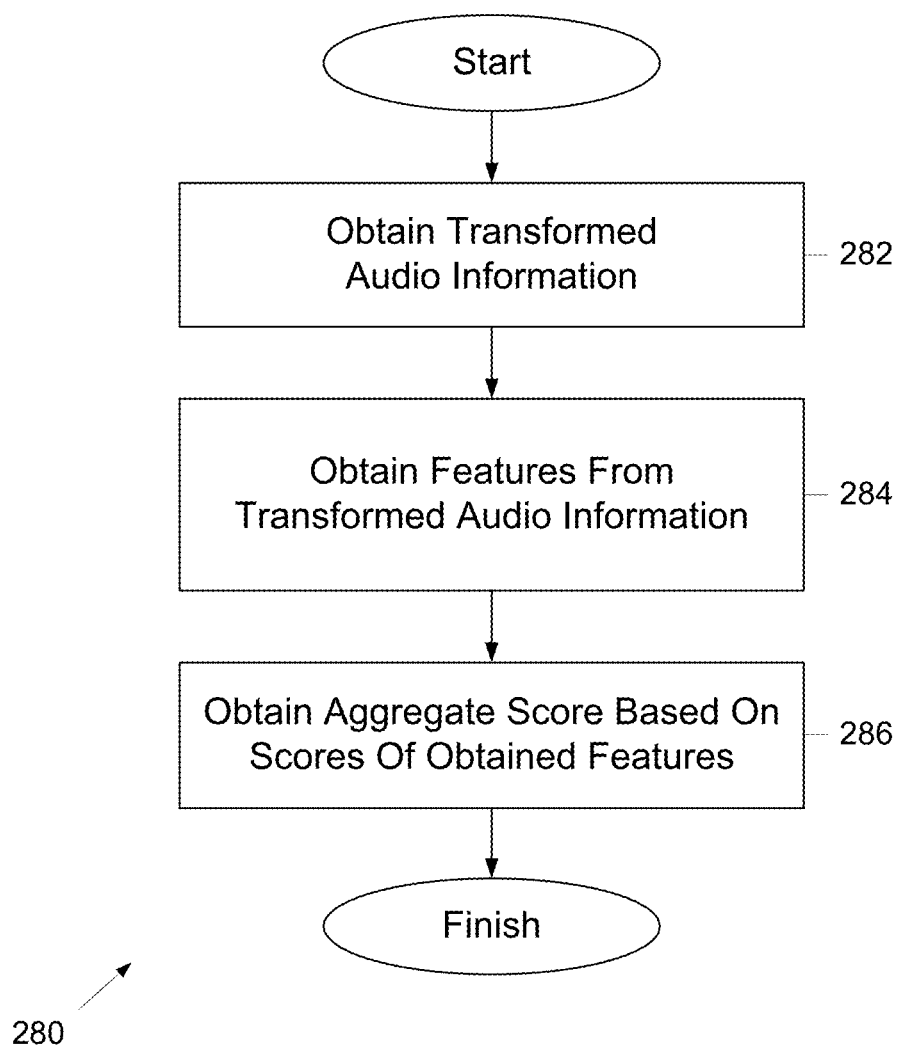
FIG. 18 illustrates a method for segmenting and/or classifying an audio signal from transformed audio information, in accordance with one or more implementations.

FIG. 18 illustrates a method 280 for segmenting and/or classifying an audio signal from transformed audio information. At an operation 282, transformed audio information representing a sound may be obtained. The transformed audio information may specify magnitude of a coefficient related to energy amplitude as a function of frequency for the audio signal and time. In some implementations, operation 282 may include some or all of the operations of method 180 (shown in FIG. 12 and described above).

At an operation 284, features associated with the audio signal may be obtained from the transformed audio information. Individual ones of the features may be associated with a feature score relative to a predetermined speaker model. According to some implementations, one or more of the features may be obtained from modules that are the same as or similar to information reduction module 58 (shown in FIG. 1 and described above), spectral slope module 60 (shown in FIG. 1 and described above), other modules, and/or another source. In some implementations, operation 284 may be performed by an audio features module that is the same as or similar to audio features module 56 (shown in FIG. 1 and described above).

At an operation 286, an aggregate score may be obtained based on the feature scores according to a weighting scheme. The weighting scheme may be associated with a noise and/or SNR estimation. The aggregate score may be used in conjunction with the predetermined speaker model to identify a source of the sound (e.g., a specific person) in the audio signal. In some implementations, operation 286 may be performed by an aggregate score module that is the same as or similar to aggregate score module 62 (shown in FIG. 1 and described above).

Figure 19:
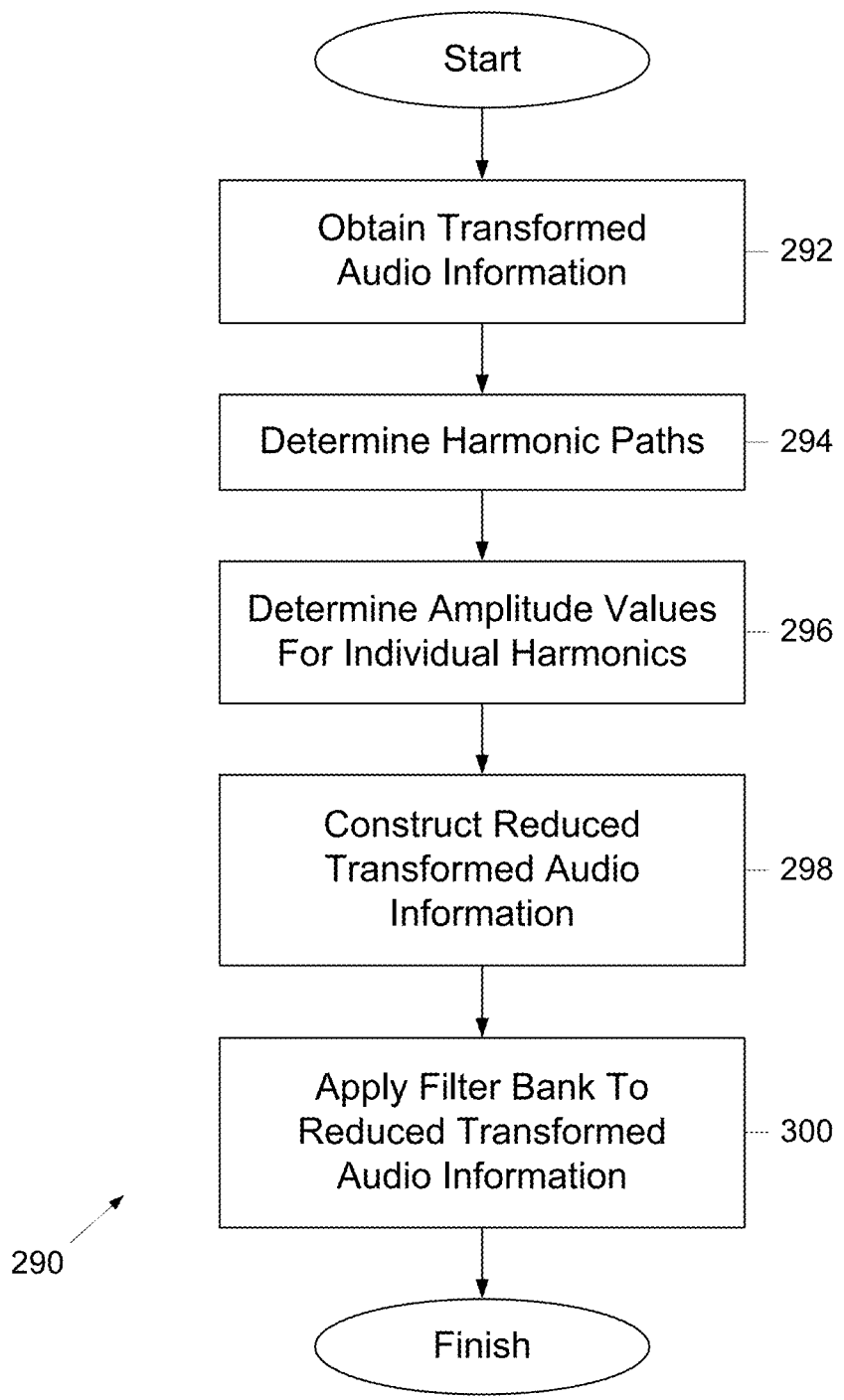
FIG. 19 illustrates a method for obtaining reduced transformed audio information as a feature associated with an audio signal, in accordance with one or more implementations.

FIG. 19 illustrates a method 290 for obtaining reduced transformed audio information as a feature associated with an audio signal. At an operation 292, transformed audio information representing a sound may be obtained. The transformed audio information may specify magnitude of a coefficient related to energy amplitude as a function of frequency for the audio signal and time. In some implementations, operation 292 may include some or all of the operations of method 180 (shown in FIG. 12 and described above).

At an operation 294, harmonic paths may be determined for individual harmonics of the sound based on fractional chirp rate and harmonic number. In some implementations, operation 294 may be performed by an information reduction module that is the same as or similar to information reduction module 58 (shown in FIG. 1 and described above).

At an operation 296, an amplitude value for individual harmonics may be determined at individual time windows. In some implementations, operation 296 may be performed by an information reduction module that is the same as or similar to information reduction module 58 (shown in FIG. 1 and described above).

At an operation 298, the reduced transformed audio information may be constructed to include the amplitude values for individual harmonics as a function of frequency and time. Values within the reduced transformed audio information between the amplitude values may be set to zero. In some implementations, operation 298 may be performed by an information reduction module that is the same as or similar to information reduction module 58 (shown in FIG. 1 and described above).

At an operation 300, a filter bank may be applied to the reduced transformed audio information. In some implementations, operation 300 may be performed by an information reduction module that is the same as or similar to information reduction module 58 (shown in FIG. 1 and described above).

Figure 20:
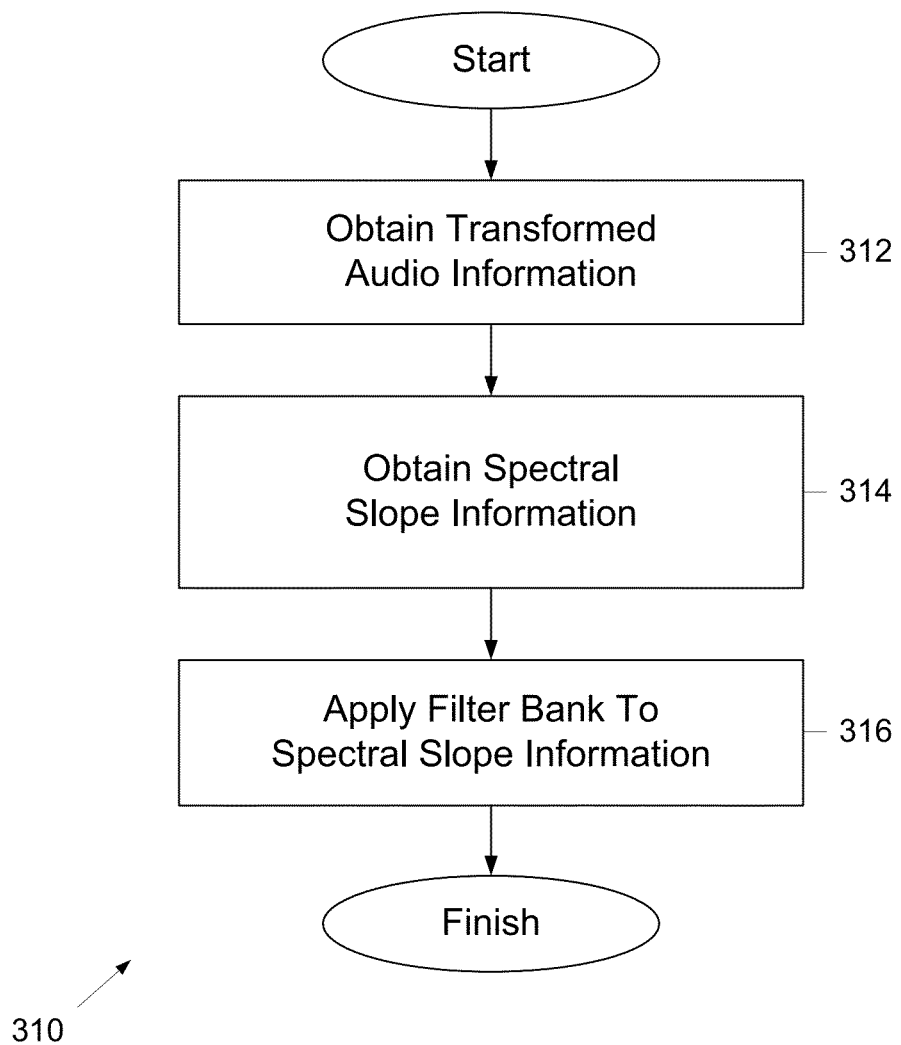
FIG. 20 illustrates a method for obtaining spectral slope information based on the transformed audio information as a feature associated with the audio signal, in accordance with one or more implementations.

FIG. 20 illustrates a method 310 for obtaining spectral slope information based on the transformed audio information as a feature associated with the audio signal. At an operation 312, transformed audio information representing a sound may be obtained. The transformed audio information may specify magnitude of a coefficient related to energy amplitude as a function of frequency for the audio signal and time. In some implementations, operation 312 may include some or all of the operations of method 180 (shown in FIG. 12 and described above).

At an operation 314, instantaneous slope of the harmonic envelope of a sound having a specific pitch may be obtained as a function of frequency as the spectral slope information. In accordance with some implementations, the instantaneous slope may be determined by taking a derivative over frequency of the harmonic envelope at the specific pitch. In some implementations, operation 314 may be performed by a spectral slope module that is the same as or similar to spectral slope module 60 (shown in FIG. 1 and described above).

At an operation 316, a filter bank may be applied to the spectral slope information. In some implementations, operation 316 may be performed by a spectral slope module that is the same as or similar to spectral slope module 60 (shown in FIG. 1 and described above).

Figure 21:
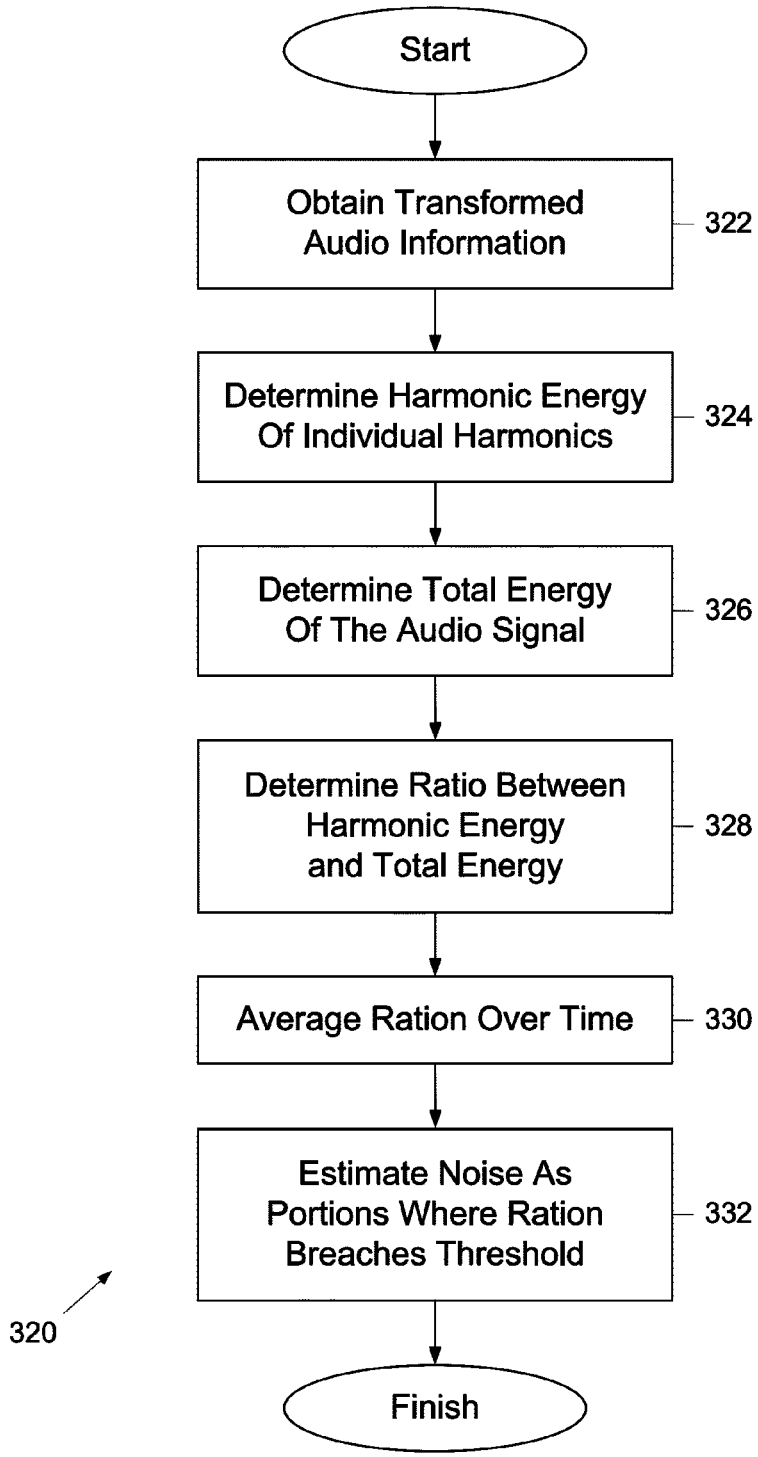
FIG. 21 illustrates a method for obtaining a noise and/or signal-to-noise ratio estimation associated with the audio signal, in accordance with one or more implementations.

FIG. 21 illustrates a method 320 for obtaining a noise and/or SNR estimation associated with the audio signal. At an operation 322, transformed audio information representing a sound may be obtained. The transformed audio information may specify magnitude of a coefficient related to energy amplitude as a function of frequency for the audio signal and time. In some implementations, operation 322 may include one or more of the operations of method 180 (shown in FIG. 12 and described above).

At an operation 324, a harmonic energy of individual harmonics may be determined as a function of frequency and time based on the transformed audio information. In some implementations, operation 322 may be performed by a noise estimator module that is the same as or similar to noise estimator module 62 (shown in FIG. 1 and described above).

At an operation 326, a total energy of the audio signal may be determined based on the transformed audio information. In some implementations, operation 324 may be performed by a noise estimator module that is the same as or similar to noise estimator module 62 (shown in FIG. 1 and described above).

At an operation 328, a ratio between the harmonic energy and the total energy may be determined. In some implementations, operation 328 may be performed by a noise estimator module that is the same as or similar to noise estimator module 62 (shown in FIG. 1 and described above).

At an operation 330, the ratio between the harmonic energy and the total energy may be averaged over time. In some implementations, operation 330 may be performed by a noise estimator module that is the same as or similar to nloise estimator module 62 (shown in FIG. 1 and described above).

At an operation 332, noise may be estimated as portions of the transformed audio information where the ratio breaches a predetermined threshold. In some implementations, operation 332 may be performed by a noise estimator module that is the same as or similar to noise estimator module 62 (shown in FIG. 1 and described above).

The operations of methods 180, 190, 200, 240, 250, 270, 280, 290, 310, and 320 presented herein are intended to be illustrative. In some embodiments, one or more of methods 180, 190, 200, 240, 250, 270, 280, 290, 310, and/or 320 may be accomplished with one or more additional operations not described, and/or without one or more of the operations discussed. Additionally, the order in which the operations of methods 180, 190, 200, 240, 250, 270, 280, 290, 310, and 320 are illustrated in FIG. 1 and described herein is not intended to be limiting.

In some embodiments, one or more of methods 180, 190, 200, 240, 250, 270, 280, 290, 310, and/or 320 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of one or more of methods 180, 190, 200, 240, 250, 270, 280, 290, 310, and/or 320 in response to instructions stored electronically on an electronic storage medium. The one or more processing devices may include one or more devices configured through hardware, firmware, and/or software to be specifically designed for execution of one or more of the operations of one or more of methods 180, 190, 200, 240, 250, 270, 280, 290, 310, and/or 320.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to process a sound signal, the system comprising:
   one or more processors configured to execute computer program modules, the computer program modules comprising:
   a first set of one or more modules configured to transform individual time sample windows of the audio signal into the frequency-chirp domain, wherein the frequency-chirp domain representation of a given time sample window specifies a transform coefficient as a function of frequency and fractional chirp rate for the signal portion, wherein fractional chirp rate is chirp rate divided by frequency;
   a second set of one or more computer program modules configured to determine, from the transformed audio signal for the given time sample window, a pitch likelihood metric as a function of pitch and fractional chirp rate for the audio signal within the time sample window; and
   a third set of one or more computer program modules configured to determine, based on the pitch likelihood metric, estimated pitch and estimated fractional chirp rate for the individual time sample windows.

2. The system of claim 1, wherein the second set of one or more computer program modules are configured (i) to determine, from the transformed audio signal for the given time sample window, a tone likelihood metric as a function of frequency for the audio signal within the time sample window, and (ii) to determine the pitch likelihood metric for the given time sample window from the tone likelihood metric.

3. The system of claim 1, wherein the third set of one or more computer program modules are configured (i) to divide the time sample windows into groups within processing time windows, (ii) to identify a primary time sample window within a given processing time window, (iii) to determine pitch for time sample windows within the given processing time window by iterating through the processing time window from the primary time sample window toward one or both of the boundaries of the processing time window and determining the estimated pitch and estimated fractional chirp rate for a given time sample window from values of pitch likelihood metric weighted based on parameters of sound determined for a time sample window adjacent to the given time sample window.

4. The system of claim 3, wherein the third set of one or more computer program modules are configured such that the parameters of sound within the adjacent time sample window used to weight pitch likelihood metric in the given time sample window include one or more of estimated pitch, estimated chirp, or harmonic envelope.

5. The system of claim 1, wherein the computer program modules further comprise a fourth set of one or more computer modules configured to reconstruct sound represented by the audio signal based on one or both of the transformed audio signal generated by the first set of one or more computer program modules and/or the estimated pitch and estimated chirp rate determined by the third set of one or more computer program modules.

6. The system of claim 1, wherein the computer program modules further comprise a fifth set of one or more computer modules configured to classify one or more speakers that voiced one or more sounds represented in the audio signal based on one or both of the transformed audio signal generated by the first set of one or more computer program modules and/or the estimated pitch and estimated chirp rate determined by the third set of one or more computer program modules.

7. A computer-implemented method of processing a sound signal, the method being implemented in a computer system that includes one or more physical processors, the method comprising:

transforming, on the one or more processors, individual time sample windows of the audio signal into the frequency-chirp domain, wherein the frequency-chirp domain representation of a given time sample window specifies a transform coefficient as a function of frequency and fractional chirp rate for the signal portion, wherein fractional chirp rate is chirp rate divided by frequency;

determining, on the one or more processors from the transformed audio signal for the given time sample window, a pitch likelihood metric as a function of pitch and fractional chirp rate for the audio signal within the time sample window; and determining, on the one or more processors based on the pitch likelihood metric, estimated pitch and estimated fractional chirp rate for the individual time sample windows.

8. The method of claim 7, further comprising:

determining, from the transformed audio signal for the given time sample window, a tone likelihood metric as a function of frequency for the audio signal within the time sample window; and determining the pitch likelihood metric for the given time sample window from the tone likelihood metric.

9. The method of claim 7, further comprising:

on the one or more processors, dividing the time sample windows into groups within processing time windows;

on the one or more processors, identifying a primary time sample window within a given processing time window; and on the one or more processors, determining pitch for time sample windows within the given processing time window by iterating through the processing time window from the primary time sample window toward one or both of the boundaries of the processing time window and determining the estimated pitch and estimated fractional chirp rate for a given time sample window from values of pitch likelihood metric weighted based on parameters of sound determined for a time sample window adjacent to the given time sample window.

10. The method of claim 9, wherein the parameters of sound within the adjacent time sample window used to weight pitch likelihood metric in the given time sample window include one or more of estimated pitch, estimated chirp, or harmonic envelope.

11. The method of claim 7, further comprising, on the one or more processors, reconstructing sound represented by the audio signal based on one or both of the transformed audio signal and/or the estimated pitch and estimated chirp rate.

12. The method of claim 7, further comprising, on the one or more processors, classifying one or more speakers that voiced one or more sounds represented in the audio signal based on one or both of the transformed audio signal and/or the estimated pitch and estimated chirp rate.

* * * * *